(12) United States Patent
Jang et al.

(10) Patent No.: US 12,504,902 B2
(45) Date of Patent: Dec. 23, 2025

(54) STORAGE DEVICE PROVIDING HIGH PURGE PERFORMANCE AND MEMORY BLOCK MANAGEMENT METHOD THEREOF

(71) Applicant: SAMSUNG ELECTRONICS CO., LTD., Suwon-si (KR)

(72) Inventors: Youngjoon Jang, Suwon-si (KR); Jinhwan Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 18/124,821

(22) Filed: Mar. 22, 2023

(65) Prior Publication Data
US 2023/0384957 A1 Nov. 30, 2023

(30) Foreign Application Priority Data

May 30, 2022 (KR) .................. 10-2022-0065998
Jul. 13, 2022 (KR) .................. 10-2022-0086464

(51) Int. Cl.
*G06F 3/06* (2006.01)
*G06F 12/02* (2006.01)

(52) U.S. Cl.
CPC ............ *G06F 3/064* (2013.01); *G06F 3/0652* (2013.01); *G06F 3/0679* (2013.01); *G06F 12/0253* (2013.01); *G06F 3/0604* (2013.01)

(58) Field of Classification Search
CPC ......... G06F 12/0253; G06F 2212/1024; G06F 2212/7205
See application file for complete search history.

(56) References Cited

U.S. PATENT DOCUMENTS

| | | | |
|---|---|---|---|
| 7,430,136 | B2 | 9/2008 | Merry, Jr. et al. |
| 10,522,229 | B2 | 12/2019 | Luo et al. |
| 10,621,087 | B2 | 4/2020 | Seo et al. |
| 10,761,780 | B2 | 9/2020 | Miura et al. |
| 10,996,883 | B2 | 5/2021 | Kim et al. |
| 2009/0168525 | A1 | 7/2009 | Olbrich et al. |
| 2012/0278564 | A1 | 11/2012 | Goss et al. |
| 2019/0121570 | A1 | 4/2019 | Kim et al. |
| 2021/0141540 | A1 | 5/2021 | Gervais |
| 2021/0405907 | A1 | 12/2021 | Nagai |
| 2022/0012172 | A1 | 1/2022 | Ostrovsky et al. |

(Continued)

OTHER PUBLICATIONS

Communication issued on Nov. 3, 2023 by the European Patent Office in European Patent Application No. 23163934.5.

*Primary Examiner* — Nicholas A. Paperno
(74) *Attorney, Agent, or Firm* — Sughrue Mion, PLLC

(57) ABSTRACT

A storage device performing a purge operation in response to a replay protected memory block (RPMB) purge command comprises at least one nonvolatile memory device; and a storage controller. The storage controller is configured to control data input and data output of the at least one nonvolatile memory device, track a at least one RPMB of the at least one nonvolatile memory device in which RPMB data is stored, and trigger a garbage collection based on a number of the RPMBs reaching a threshold, and the storage controller is further configured to, based on allocating a log block to which write data is to be programmed, give priority to a memory block corresponding to the RPMB among free blocks over a non-RPMB block among the free blocks.

20 Claims, 16 Drawing Sheets

(56) References Cited

U.S. PATENT DOCUMENTS

| | | |
|---|---|---|
| 2022/0075523 A1 | 3/2022 | Muthukumaran et al. |
| 2022/0083249 A1 | 3/2022 | Jung et al. |
| 2022/0100373 A1 | 3/2022 | Ke |
| 2022/0164487 A1 | 5/2022 | Gyllenskog et al. |
| 2023/0142767 A1* | 5/2023 | Nakanishi ............. G06F 3/0631 |
| | | 711/154 |

* cited by examiner

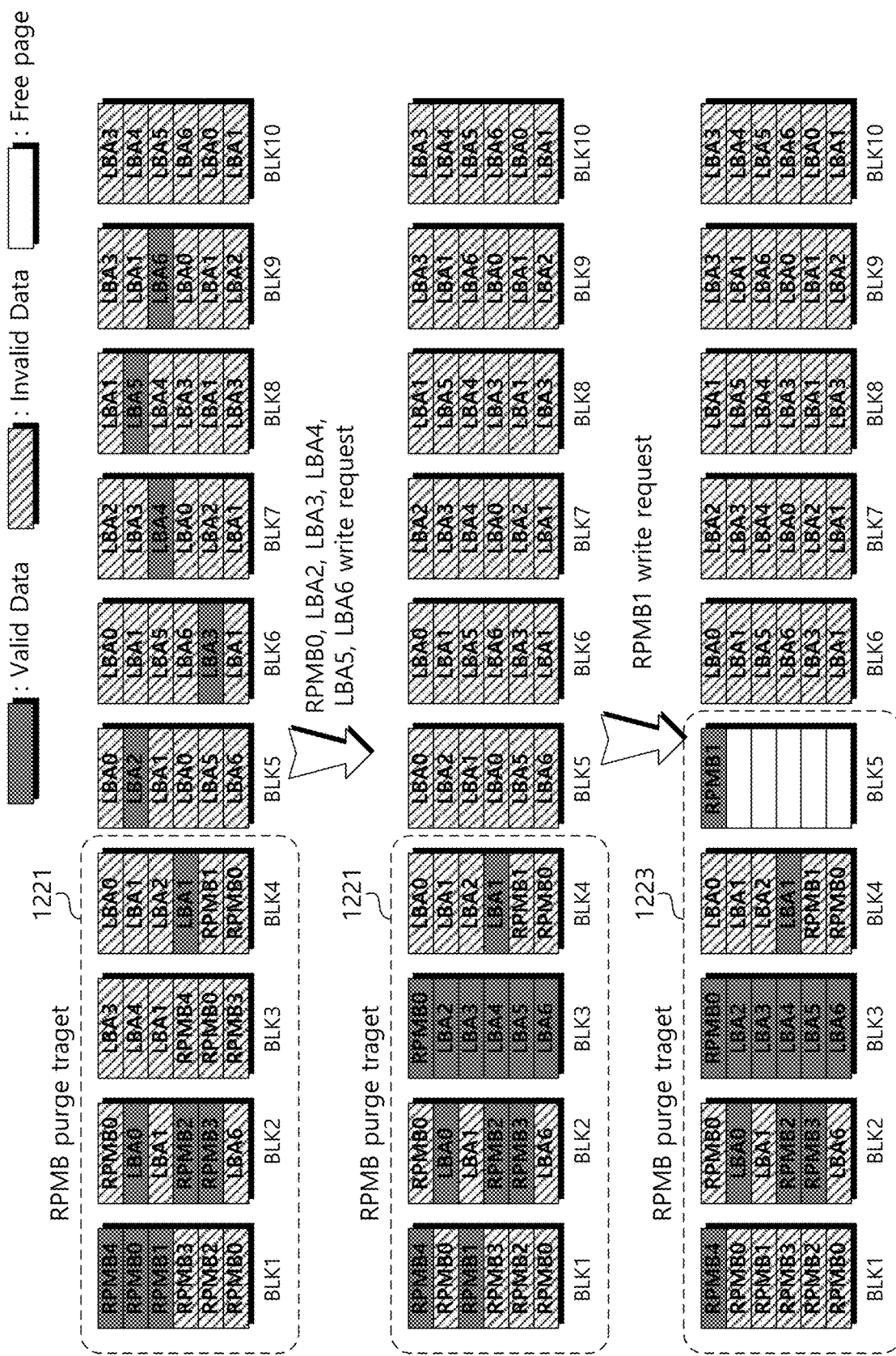

STORAGE DEVICE PROVIDING HIGH PURGE PERFORMANCE AND MEMORY BLOCK MANAGEMENT METHOD THEREOF

CROSS-REFERENCE TO RELATED APPLICATIONS

This application claims priority under 35 U.S.C. § 119 to Korean Patent Application No. 10-2022-0065998 filed on May 30, 2022, and Korean Patent Application No. 10-2022-0086464 filed on Jul. 13, 2022, in the Korean Intellectual Property Office, the disclosures of which are incorporated by reference herein in their entireties.

BACKGROUND

The present disclosure described herein relates to a semiconductor memory device, and more particularly, to a storage device capable of increasing purge performance and a method for managing a memory block thereof.

In recent years, various mobile devices or electronic devices such as smart phones, desktop computers, laptop computers, tablet PCs, and wearable devices have been widely used. These electronic devices usually include a storage device for storing data. For example, due to the trend of increasing the capacity (e.g., volatile memory) and speed (e.g., processing power) of the electronic devices, many efforts have been made to increase the capacity of the storage device and improve the speed of the storage device. As part of these efforts, various protocols for performing interfacing between a host device of an electronic device and a storage device have been adopted.

Storage devices included in electronic devices may include a nonvolatile memory device such as flash memory, phase-change RAM (PRAM), magnetic RAM (MRAM), resistive RAM (RRAM), ferroelectric RAM (FRAM), etc. For example, some nonvolatile memory devices cannot be overwritten, and a purge operation of physically erasing existing data is performed for security reasons.

In the purge operation, specified targeted data that is invalid (e.g., invalid data) is not specified. Therefore, as a result, the general purge operation causes physical erasure of all invalid data stored in the storage device, resulting in degradation of performance of the storage device. Recently, protocols for providing a purge command for a Replay Protected Memory Block (RPMB) have emerged. However, even in this case, since the target specific RPMB data is not specified, physical erasure of all invalid RPMB data inevitably occurs. When RPMB data is distributed in a plurality of memory blocks, due to the characteristics of the purge operation, the response of the storage device is delayed, resulting in deterioration of the performance of the storage device.

SUMMARY

Embodiments of the present disclosure provide a storage device capable of increasing purge performance for replay protected memory block RPMB data and a method for managing a memory block thereof.

According to an aspect of an example embodiment, a storage device performing a purge operation in response to a replay protected memory block (RPMB) purge command, includes: at least one nonvolatile memory device; and a storage controller configured to control data input and data output of the at least one nonvolatile memory device, track a at least one RPMB of the at least one nonvolatile memory device in which RPMB data is stored, and trigger a garbage collection based on a number of the RPMBs reaching a threshold, wherein the storage controller is further configured to, based on allocating a log block to which write data is to be programmed, give priority to a memory block corresponding to the RPMB among free blocks over a non-RPMB block among the free blocks.

According to an aspect of an example embodiment, a storage device includes: a nonvolatile memory device; and a storage controller configured to perform garbage collection based on a number of replay protected memory blocks (RPMBs) in which RPMB data is stored among the memory blocks of the nonvolatile memory device reaching a threshold value.

According to an aspect of an example embodiment, a method for managing a memory block of a storage device that performs a purge operation in response to a replay protected memory block (RPMB) purge command, includes: determining whether a number of RPMBs in which RPMB data is stored reaches a threshold value; selecting, from a plurality of free blocks, one of the plurality of free blocks including invalid RPMB data in response to a determination the number of RPMBs reaches the threshold value; and copying valid data collected from a RPMB from the number of RPMBs to the selected one of the plurality of free blocks.

BRIEF DESCRIPTION OF THE FIGURES

The above and other aspects and features of the present disclosure will become apparent by describing in detail embodiments thereof with reference to the accompanying drawings, in which:

FIG. 9A and FIG. 9B are examples in which the number of RPMB increases in a general case in which the number of RPMB is not limited;

DETAILED DESCRIPTION

It is to be understood that both the foregoing general description and the following detailed description are exemplary, and it is to be considered that an additional description of the claimed invention is provided. Reference signs are indicated in detail in embodiments of the present disclosure, examples of which are indicated in the reference drawings. Wherever possible, the same reference numbers are used in the description and drawings to refer to the same or like parts.

Figure 1:
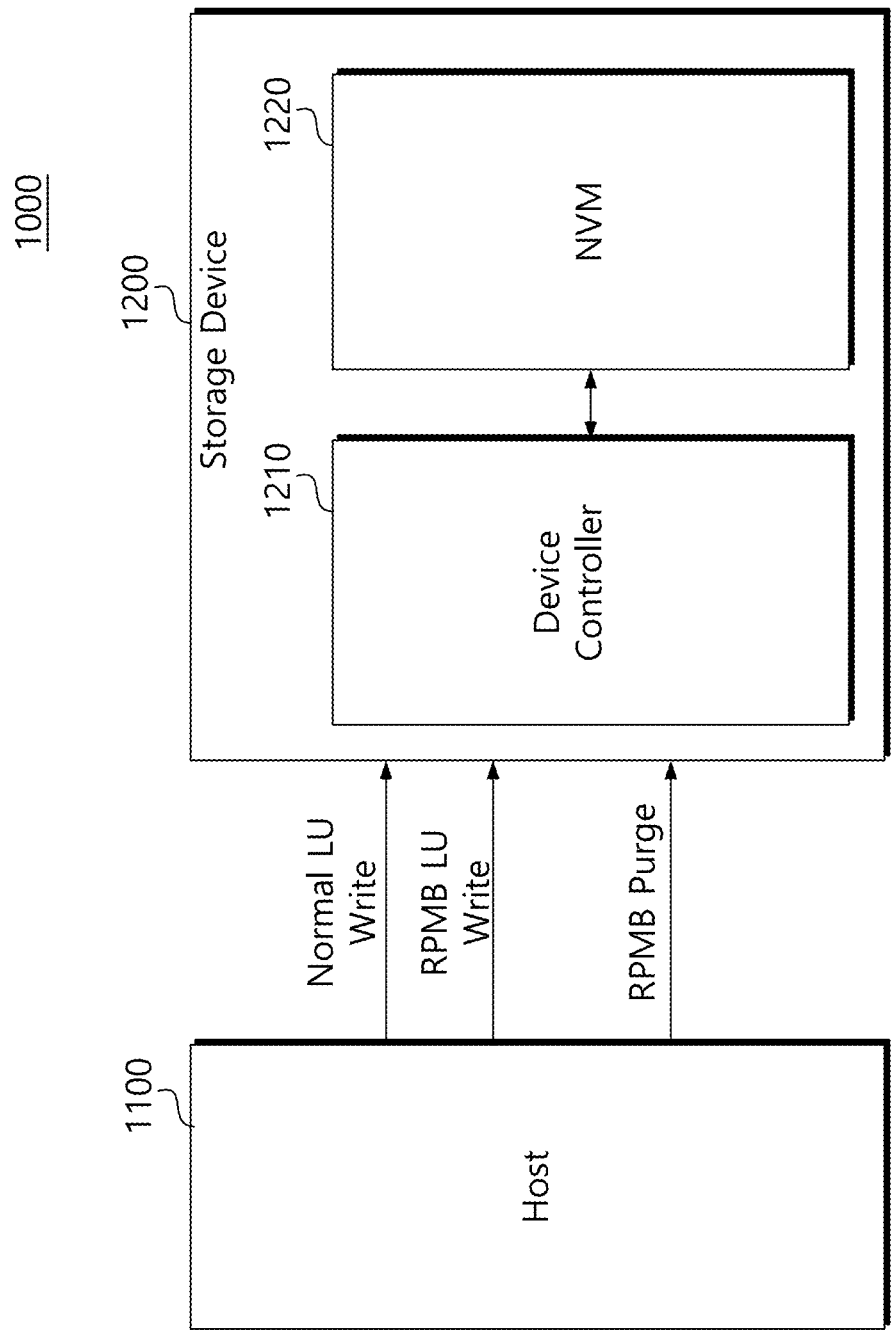
FIG. 1 is a block diagram illustrating a system configured to perform a replay protected memory block purge operation according to one or more embodiments of the present disclosure.

FIG. 1 is a block diagram illustrating a system configured to perform a replay protected memory block (RPMB) purge operation, according to one or more embodiments of the present disclosure. The system 1000 may include a host 1100 and a storage device 1200. In one or more embodiments, a normal purge operation may refer to physically erasing all invalid data stored in the storage device 1200, and a RPMB purge operation may refer to physically erasing RPMB data among invalid data stored in the storage device 1200.

The host 1100 may manage and process general operations of the system 1000. The host 1100 may perform various arithmetic/logical operations. For example, the host 1100 may include one or more processor cores. The host 1100 may be implemented using a dedicated circuit such as Field Programmable Gate Arrays (FPGA) or Application Specific Integrated Circuit (ASIC), or implemented as a System on Chip (SoC). For example, the host 1100 may include a general-purpose processor, a dedicated processor, or an application processor. The host 1100 may be a processor itself, or an electronic device or system including a processor.

The host 1100 may generate a command and write data to the storage device according to a write request. The write request may be generated based on an external device in communication with the host, or based on an application being executed by the host. Furthermore, the host 1100 may generate an un-map command or a purge request according to the erase request. For example, a write command, write data, an un-map command, and/or a purge request are converted into packets (e.g., CMDw UPIU, DATA UPIU) including UPIU (UFS Protocol Information Unit) according to the interface protocol proposed by JEDEC. For example, the host 1100 may generate an RPMB LU write request when writing data such as an authentication key to ensure a security function. Furthermore, the host 1100 may provide a purge command (hereinafter, for example, RPMB purge) for RPMB data invalidated through overwriting to the storage device 1200.

The storage device 1200 may include a storage controller 1210 and a nonvolatile memory device 1220. The storage controller 1210 may manage a mapping table defining a correspondence between logical addresses and physical addresses of data stored (or to be stored) in the nonvolatile memory device 1220. Furthermore, the storage controller 1210 may perform the purge operation on the invalidated RPMB data in response to the RPMB purge request from the host 1100. For example, the storage controller 1210 may physically erase the invalidated RPMB data area according to the RPMB purge request from the host 1100.

For example, the storage controller 1210 has a function of tracking a memory block (hereinafter, for example, referred to as a RPMB) in which RPMB data is stored. More specifically, the storage controller 1210 has a function of tracking a memory block in which valid RPMB data is stored or a memory block in which invalid RPMB data is logically erased. Hereinafter, a memory block storing valid RPMB data and a memory block including invalid RPMB data may be collectively referred to as an RPMB.

The storage controller 1210 may limit the number of RPMB to a specific number or less. For example, when the number of tracked RPMB reaches a predetermined threshold, the storage controller 1210 may perform garbage collection on the RPMB. Furthermore, when a new log block needs to be allocated, the storage controller 1210 may give priority to a free block having invalid RPMB data among free blocks. The storage controller 1210 may limit the number of RPMBs by managing garbage collection and log block allocation priorities for the RPMBs. As an example, a free block may be a block that is available to be designated as the log block According to the above-described configuration in one or more embodiments, the storage device 1200 of the present disclosure may manage the number of RPMBs to be less than a predetermined threshold. When an RPMB purge command is received, it may be known that the time required for purge increases according to the number of RPMBs. Based on the embodiments of the present disclosure, performance degradation or latency that occurs in response to an RPMB purge request is advantageously reduced.

Figure 2:
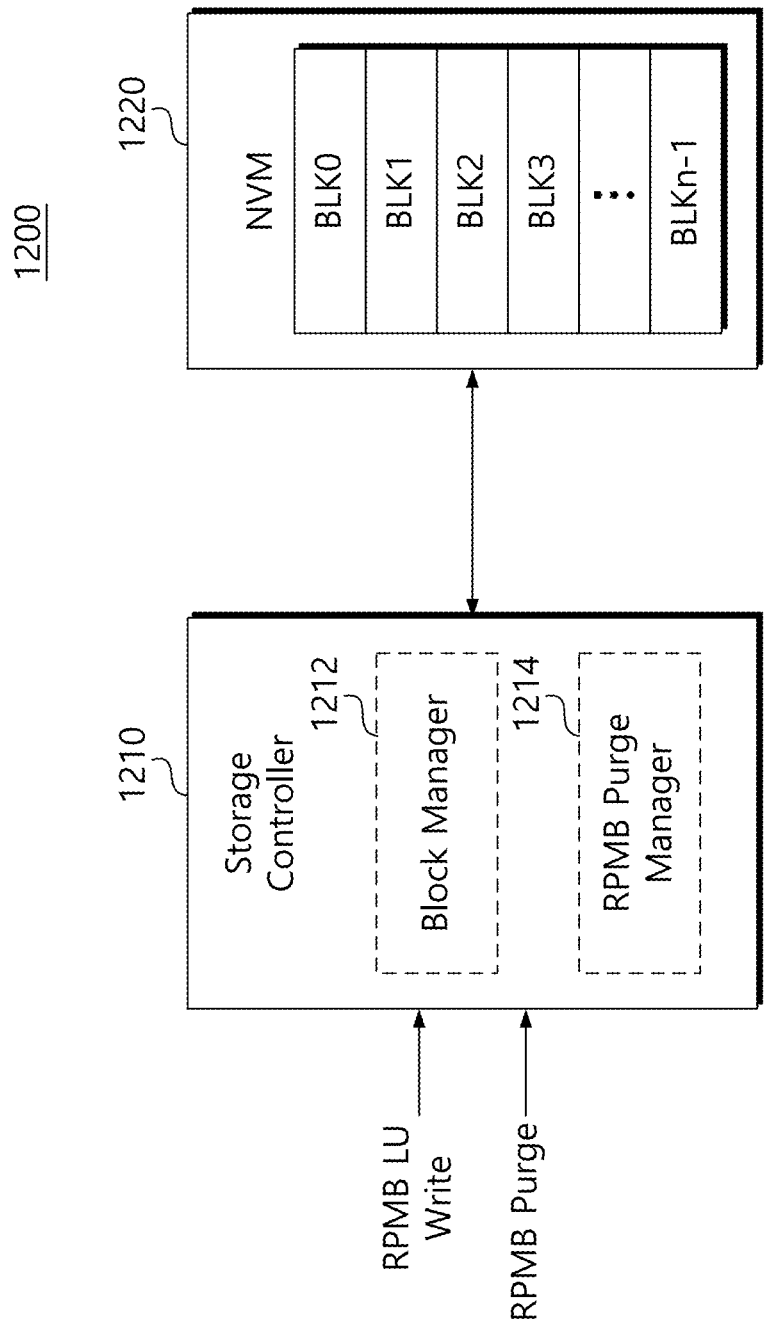
FIG. 2 is a detailed block diagram illustrating a configuration of a storage device according to one or more embodiments of the present disclosure.

FIG. 2 is a detailed block diagram illustrating a configuration of a storage device according to one or more embodiments of the present disclosure. Referring to FIG. 2, the storage device 1200 may include a storage controller 1210 and a nonvolatile memory device 1220. For example, each of the storage controller 1210 and the nonvolatile memory device 1220 may be provided as one chip, one package, or one module. In one or more additional examples, the storage controller 1210 and the nonvolatile memory device 1220 may be formed as one chip, one package, or one module to be provided as storage such as an embedded memory, a memory card, a memory stick, and a solid state drive SSD.

The storage controller 1210 may be configured to control the nonvolatile memory device 1220. For example, the storage controller 1210 may write data to or read data stored in the nonvolatile memory device 1220 according to a request from the host 1100 (FIG. 1). In order to access the nonvolatile memory device 1220, the storage controller 1210 may provide a command, an address, data, and/or a control signal to the nonvolatile memory device 1220.

For example, the storage controller 1210 may track the RPMB according to one or more embodiments of the present disclosure. Due to the function of the storage controller 1210, and based on the RPMB purge commend, performance degradation due to garbage collection or a back pattern program for the RPMB may be advantageously minimized. To this end, the storage controller 1210 may include a block manager 1212 and an RPMB purge manager 1214. The block manager 1212 and the RPMB purge manager 1214 may be implemented as hardware or software such as firmware.

The block manager 1212 may track and manage memory blocks to which RPMB data is written. For example, when a write request (RPMB LU Write) of RPMB data occurs, the block manager 1212 may convert and map the write-requested logic unit LU data into block units and page units of the nonvolatile memory device 1220. Subsequently, the block manager 1212 may allocate an RPMB identifier to a memory block in which RPMB data is written. For example, the block manager 1212 may assign a tag or a flag corresponding to the RPMB identifier to a memory block in which RPMB data is written. Alternatively, the block manager 1212 may manage a memory block in which RPMB data is written as a mapping table or list.

In addition, when an RPMB data or general data write request is issued, the block manager 1212 may preferentially allocate the memory block having the RPMB identifier among free blocks as a log block. Once an RPMB identifier is assigned to a memory block, the RPMB identifier may be tracked and managed as the RPMB by the block manager 1212 until an actual block erase occurs.

The RPMB purge manager 1214 may perform various control operations for managing the number of RPMB. In addition, the RPMB purge manager 1214 may physically erase the RPMB in response to the RPMB purge command. Here, the RPMB purge manager 1214 may perform garbage collection for managing the number of RPMBs. For example, when the number of RPMB reaches a threshold, the RPMB purge manager 1214 performs garbage collection between the RPMBs.

The RPMBs invalidated by garbage collection are listed as free blocks. Subsequently, the invalidated RPMB included in the free block list is preferentially allocated as a log block by the block manager 1212. The RPMB invalidated for allocation to the log block may be physically erased, and thereafter, back pattern data may be written. By this procedure, the number of RPMBs can be kept below the threshold. When the RPMB purge command is input, since the number of RPMBs to be purged is limited to less than the threshold, the time required for the purge operation may be managed to be less than or equal to the latency set by the user.

Here, the block manager 1212 and the RPMB purge manager 1214 may be implemented as a part of a Flash Translation Layer (FTL). Alternatively, the block manager 1212 and the RPMB purge manager 1214 may be implemented as separate devices or software that complement FTL mapping and garbage collection operations.

The FTL included in the storage controller 1210 may provide interfacing between the file system of the host 1100 and the nonvolatile memory device 1220 to hide the erase operation of the nonvolatile memory device 1220. The shortcomings of the nonvolatile memory device 1220, such as erase-before-write and mismatch between an erase unit and a write unit, may be compensated for by the FTL. In addition, the FTL may map the logical address generated by the file system of the host 1100 to the physical address of the nonvolatile memory device 1220. In addition, the may also be involved in wear leveling for managing the lifetime of the nonvolatile memory device 1220 or garbage collection for managing data capacity.

The nonvolatile memory device 1220 may store data received from the storage controller 1210 or may transmit the stored data to the storage controller 1210 under the control of the storage controller 1210. The nonvolatile memory device 1220 may include a plurality of memory blocks BLK1 to BLKn−1. Each of the plurality of memory blocks BLK1 to BLKn−1 may have a three-dimensional memory structure in which a word line layer may be stacked in a vertical direction on a substrate. Each of the plurality of memory blocks BLK1 to BLKn−1 may be managed by the storage controller 1210 based on information about the memory blocks for wear leveling such as an erase count.

According to one or more embodiments of the present disclosure, the storage device 1200 may maintain the number of RPMB below the preset threshold. As the number of RPMB increases, the time required to execute the RPBM purge command is likely to increase. The storage device 1200 of the present disclosure may maintain the number of RPMB below a number that results in minimized performance degradation. Accordingly, the storage device 1200 may advantageously minimize performance degradation based on the RPMB purge command.

Figure 3:
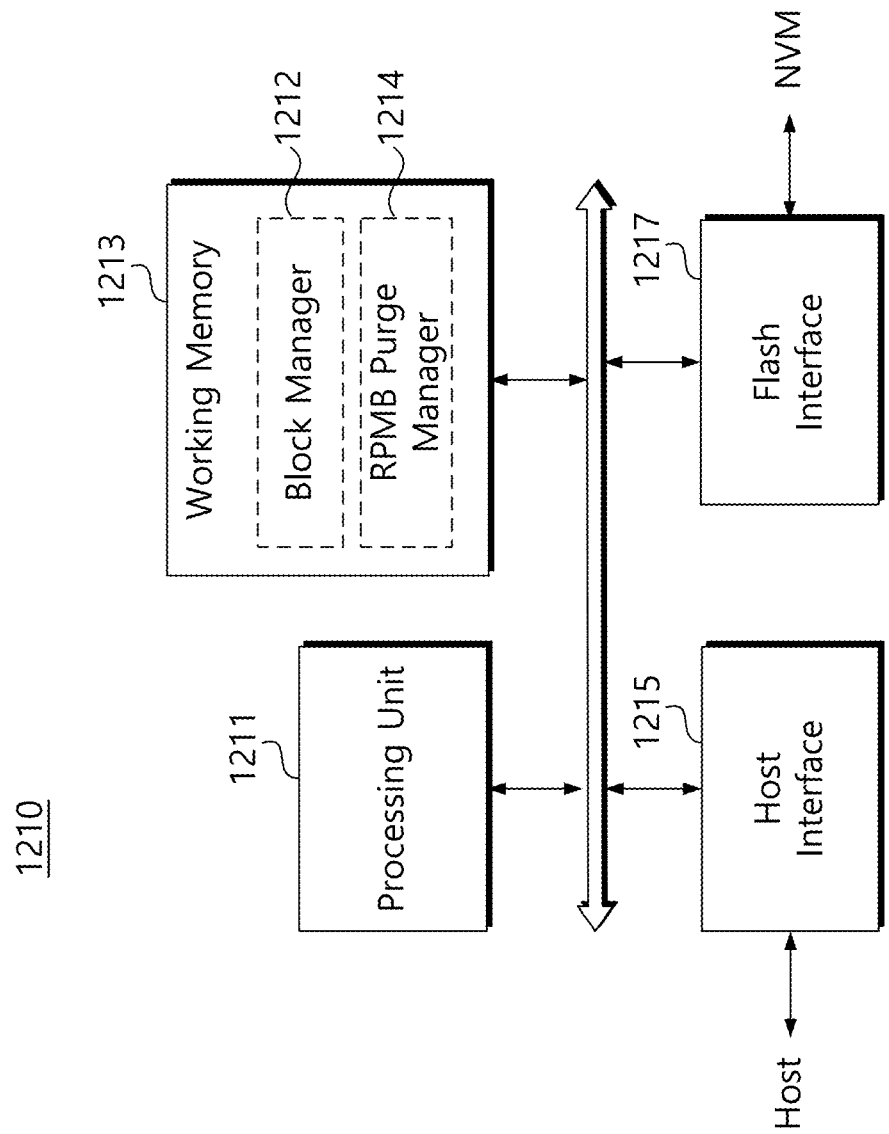
FIG. 3 is a block diagram illustrating a configuration of the storage controller of FIG. 2.

FIG. 3 is a block diagram illustrating a configuration of the storage controller of FIG. 2, according to one or more embodiments. Referring to FIG. 3, the storage controller 1210 of the present disclosure may include a processing unit 1211, a working memory 1213, a host interface 1215, and a flash interface 1217. However, it will be well understood by one or ordinary skill in the art that the components of the storage controller 1210 are not limited to the aforementioned components. For example, the storage controller 1210 may further include a read only memory ROM for storing code data required for a booting operation or an error correction code (ECC) engine.

The processing unit 1211 may include a central processing unit or a micro-processor. The processing unit 1211 may run firmware for driving the storage controller 1210. For example, the processing unit 1211 may drive software loaded into the working memory 1213. Furthermore, processing unit 1211 may execute block manager 1212 or RPMB purge manager 1214. Additionally, the processing unit 1211 may execute core functions of the storage device 1200 such as a FTL.

The working memory 1213 may be loaded with software (or firmware) or data for controlling the storage controller 1210. Software and data loaded into the working memory 1213 may be driven or processed by the processing unit 1211. For example, according to one or more embodiments of the present disclosure, a FTL, a block manager 1212, and an RPMB purge manager 1214 may be loaded into the working memory 1213. Alternatively, a FTL including the functions of the block manager 1212 or the RPMB purge manager 1214 may be loaded.

The block manager 1212 driven by the processing unit 1211 may track and manage RPMBs programmed with RPMB data. When an RPMB write request (RPMB LU Write) is received, the block manager 1212 may write write-requested data to the nonvolatile memory device 1220 and manage the block using the RPMB identifier. When a write request for RPMB data or general data occurs, a log block to program the write-requested data must be allocated. In this case, the block manager 1212 may preferentially allocate a free block having the RPMB identifier among the free blocks as a log block. Furthermore, the free block having the RPMB identifier may be provided as a log block after physical erasure.

The RPMB purge manager 1214 driven by the processing unit 1211 may perform various control operations for managing the number of RPMBs. For example, the RPMB purge manager 1214 may perform a physical erase on the RPMB in response to the RPMB purge command. The RPMB purge manager 1214 may perform garbage collection for managing the number of RPMBs to be less than a threshold. When the number of RPMBs reaches a threshold, the RPMB purge manager 1214 may perform garbage collection on the RPMBs. As an example, garbage collection may collect a particular type of data such as valid data to be rewritten to another memory block or data that is no longer needed. In this case, as a destination block to which the collected valid data is copied, any one of the RPMB in which only invalid data exists may be allocated. Here, the meaning of the destination may refer to a memory block in which the valid data collected in the garbage collection operation is programmed. Accordingly, the number of RPMBs may be reduced by garbage collection for the RPMB and may be maintained below the threshold value. When the RPMB purge command is input, since the number of RPMBs to be purged is limited to the threshold value or less, performance degradation due to the purge operation is advantageously minimized.

The FTL driven by the processing unit 1211 generally may perform functions such as address mapping, garbage collection, and wear leveling.

The host interface 1215 may provide an interface between the host and the storage controller 1210. The host and the storage controller 1210 may be connected through one of various standardized interfaces. The standard interfaces may ATA (Advanced Technology Attachment), SATA (Serial ATA), e-SATA (external SATA), SCSI (Small Computer Small Interface), SAS (Serial Attached SCSI), PCI (Peripheral component Interconnection), PCIe (PCI Express), USB (Universal Serial Bus), IEEE 1394, UFS (Universal Flash Storage), eMMC (Embedded Multi Media Card), or any other standard interface known to one of ordinary skill in the art. The standard interfaces may utilize various interface methods such as NVMe, or any other interface method known to one of ordinary skill in the art. In this disclosure, the advantages of the present disclosure will be described with reference to a UFS interface that exemplarily supports a purge command.

The flash interface 1217 may provide an interface between the storage controller 1210 and the nonvolatile memory device 1220. For example, data processed by the processing unit 1211 may be stored in the nonvolatile memory device 1220 through the flash interface 1217. In one or more examples, data stored in the nonvolatile memory device 1220 may be exchanged with the storage controller 1210 through the flash interface 1217.

The above described configuration of the storage controller 1210 exemplarily described above have been described. According to the function of the storage controller 1210 of the present disclosure, the number of RPMBs may be maintained below the threshold value. Accordingly, based on the characteristics of the storage controller 1210 of the present disclosure, performance degradation due to the RPMB purge command is significantly reduced. In addition, it will be well understood that the block manager 1212 and the RPMB purge manager 1214 implemented in software may be implemented as hardware in the storage controller 1210.

Figure 4:
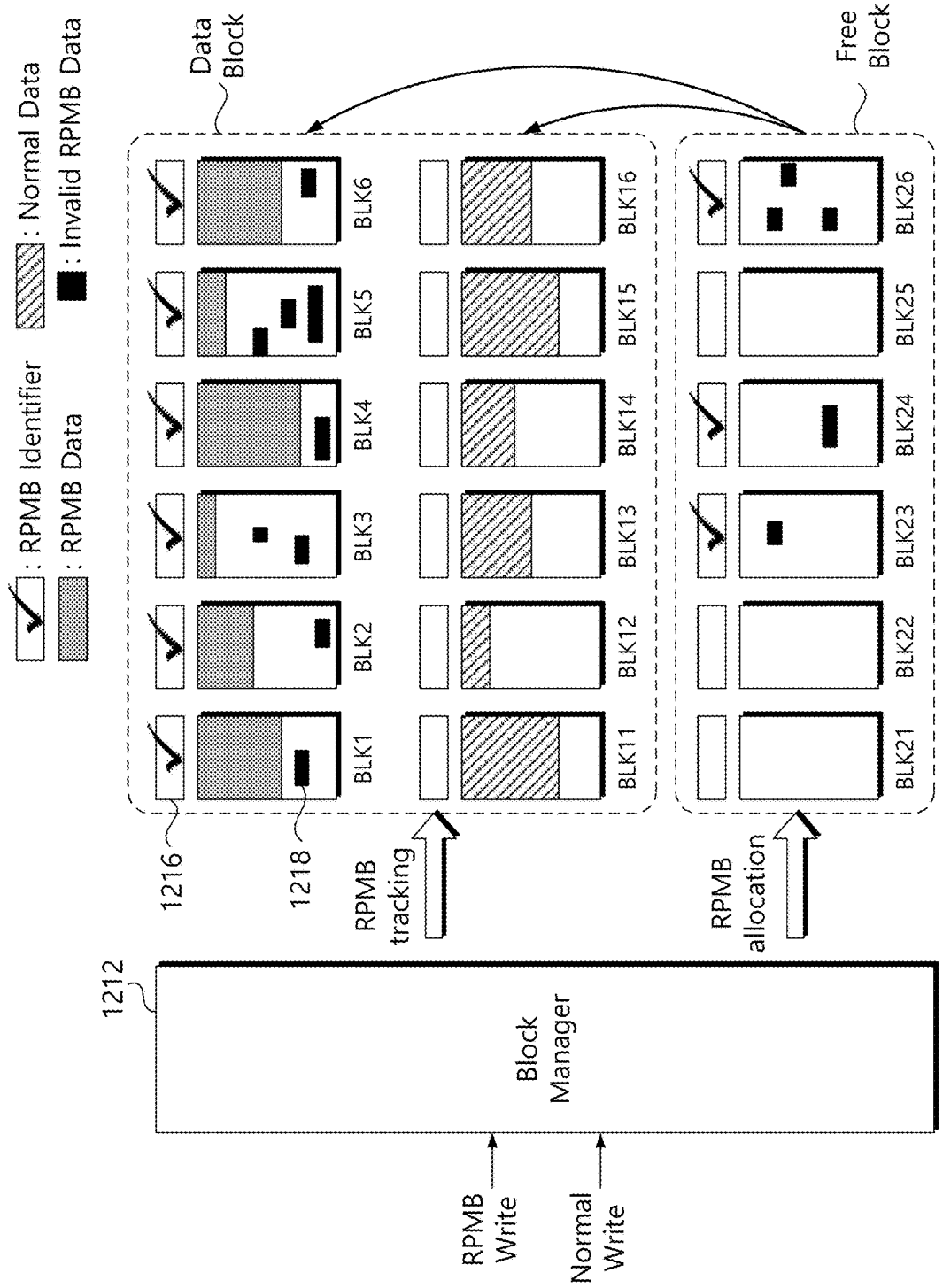
FIG. 4 is a diagram illustrating an operation of a block manager according to one or more embodiments of the present disclosure.

FIG. 4 is a diagram illustrating an operation of a block manager according to one or more embodiments of the present disclosure. Referring to FIG. 4, the block manager 1212 may track all RPMBs in which RPMB data is stored, and preferentially allocates RPMB among free blocks when allocating log block.

The block manager 1212 may track and manage memory blocks to which RPMB data is written. When an RPMB write request (RPMB Write) occurs, the block manager 1212 may assign an RPMB identifier 1216 to a memory block in which RPMB data is programmed. The RPMB identifier 1216 may be assigned in the form of a tag added to an address or data, or a separately managed table or list. Hereinafter, the memory block to which the RPMB identifier 1216 is assigned will be referred to as RPMB. In addition, the RPMB included in the free block pool will be referred to as an RPMB free block.

Once the RPMB having the RPMB identifier 1216 is created, the block manager 1212 may track and manage the physical erasing of the RPMB. For example, the block manager 1212 does not release the RPMB identifier 1216 even when valid data does not exist in the RPMB due to garbage collection or data update. Furthermore, in one or more examples, the block manager 1212 does not release the RPMB identifier 1216 even when the RPMB marked with the RPMB identifier 1216 is logically invalidated and managed as the free block. The block manager 1212 may release the RPMB identifier 1216 after any one RPMB is physically erased. Therefore, the block manager 1212 may track the physical erasing of the RPMB by assigning an RPMB identifier at a point in time when a block erase occurs with respect to the memory block in which even one page of RPMB data is written. Among the illustrated data blocks and free blocks, the RPMB may be defined as nine blocks: BLK1 to BLK6, BLK23, BLK24, and BLK26.

When an RPMB data or general data write request is issued, the block manager 1212 may allocate a memory block having the RPMB identifier 1216 from among free blocks as a log block. A log block may be a memory block having a function of a buffer area for writing data. When a write request occurs, any one of the free blocks may be selected, the block may be erased, and then allocated as a log block. After the data requested to be written to the allocated log block is programmed, the log block may be designated as a data block or the RPMB.

The block manager 1212 preferentially may allocate the RPMB to the log block when the RPMB exists in the free block pool regardless of the RPMB data write requested or the general data write requested. In another embodiment, the block manager 1212 may preferentially allocate an RPMB free block of the free block pool as a log block only upon a request to write RPMB data.

In the above example embodiments, the tracking function for the RPMB of the block manager 1212 and the function of allocating the RPMB free block to the log block have been described. The exhaustion speed of the RPMB in the nonvolatile memory device 1200 may be accelerated by the function of giving priority to the RPMB free block when the log block is allocated. The above-described function of the block manager 1212 supports the function of the RPMB purge manager 1214 that may manage the number of RPMBs to a number below the threshold value.

Figure 5:
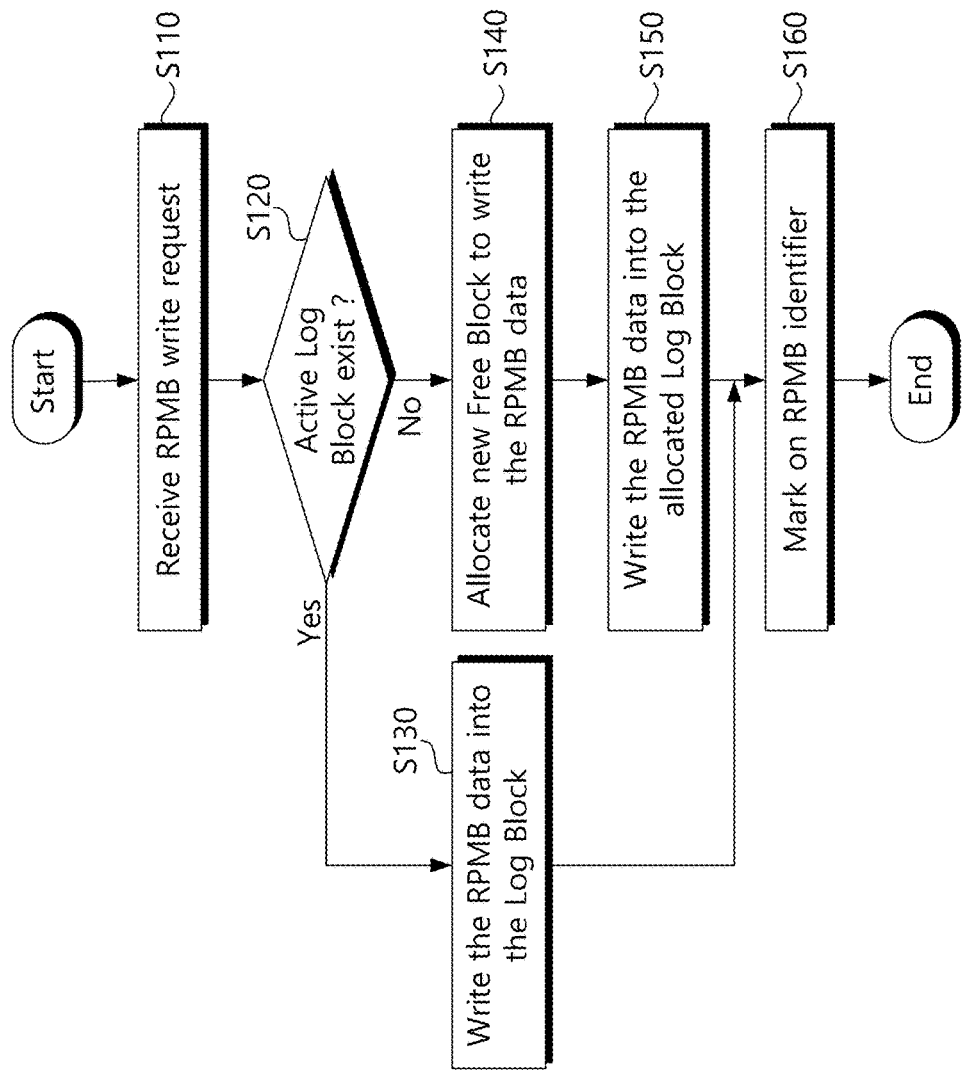
FIG. 5 is a flowchart exemplarily illustrating the operation of the block manager according to the present disclosure.

FIG. 5 is a flowchart illustrating the operation of the block manager according to one or more embodiments of the present disclosure. Referring to FIG. 5, the block manager 1212 (FIG. 4) may designate, track, and manage the memory block in which RPMB data is programmed as the RPMB upon a request to write the RPMB data. In one or more embodiments, the block manager 1212 may perform the operations of FIG. 5.

In operation S110, a request to write RPMB data is transmitted from the host 1100 (FIG. 1) to the storage device 1200. The storage controller 1210 or the block manager 1212 in the storage controller 1210 may receive a write request from the host 1100 to parse a command or decode an address.

In operation S120, the block manager 1212 determines whether a current active log block exists. Here, the active log block refers to a log block that is currently being used after being selected for data programming, and before all memory areas are filled with data. If there is a current active log block ('Yes' direction), the procedure moves to operation S130. On the other hand, if there is no current active log block ('No' direction), the procedure moves to operation S140.

In operation S130, the block manager 1212 programs the write-requested RPMB data in the active log block. When the writing of RPMB data to the active log block is completed, the active log block may be managed as a RPMB in the data block.

In operation S140, the block manager 1212 allocates a new log block since there is no current active log block. The block manager 1212 may receive any one free block from the free block pool and use the free block as an active log block. In this case, the block manager 1212 may preferentially allocate the RPMB free block of the free block pool as the log block. For example, if both an RPMB free block and non-RPMB free block are available for allocation, the RPMB free block may be selected for allocation over the non-RPMB free block.

In operation S150, the block manager 1212 programs the write-requested RPMB data in the newly allocated log block.

In operation S160, the block manager 1212 assigns an RPMB identifier to the newly allocated log block in which the RPMB data is written, and manages the log block as an RPMB.

In the above operations, the function of designating the RPMB and tracking the RPMB of the block manager 1212 has been described. The block manager 1212 may track the RPMB by assigning the RPMB identifier after writing the data to the log block when requesting to write the RPMB data. The tracking function using the RPMB identifier of the block manager 1212 may continue until the RPMB is physically erased.

Figure 6:
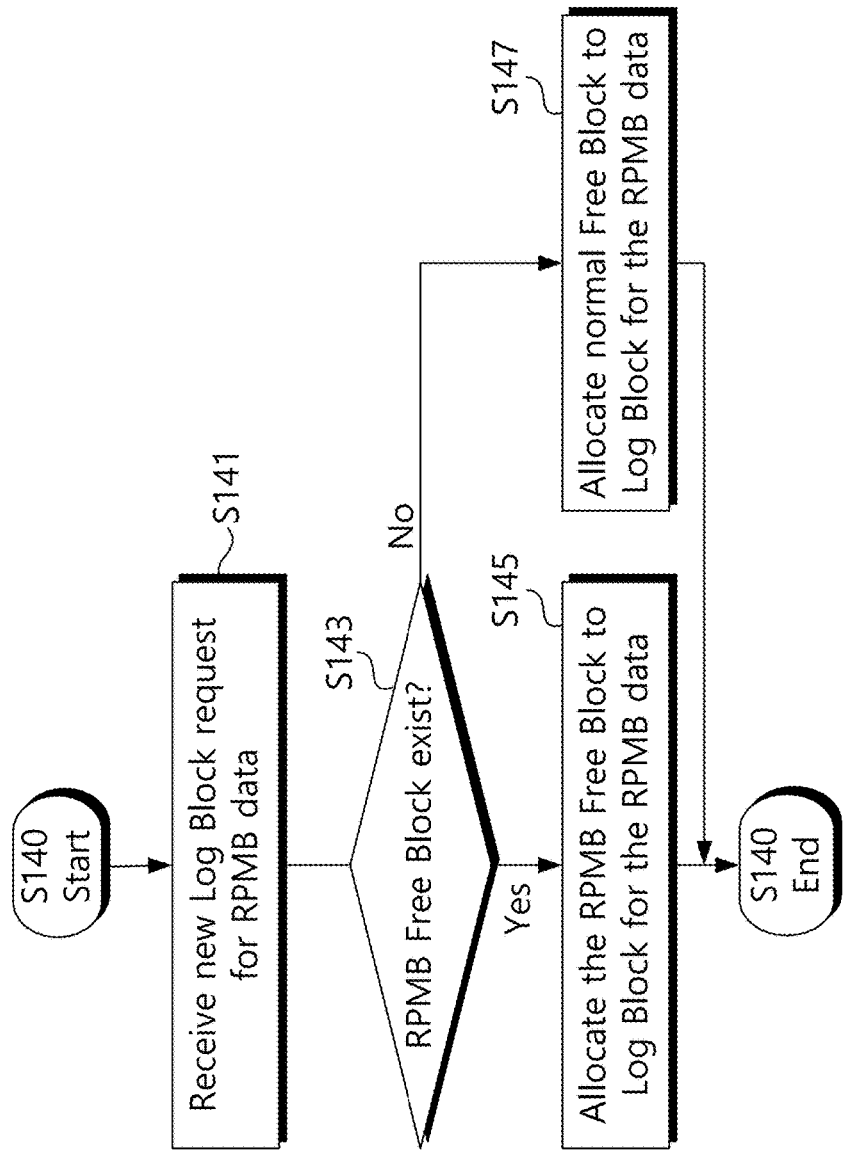
FIG. 6 is a flowchart illustrating operation S140 of FIG. 5 in more detail.

FIG. 6 is a flowchart illustrating operation S140 of FIG. 5 in more detail. Referring to FIG. 6, the block manager 1212 preferentially selects the RPMB free block when allocating the log block for writing RPMB data. For example, if both an RPMB free block and non-RPMB free block are located in the free block pool, the RPMB free block may be selected over the non-RPMB free block.

In operation S141, the block manager 1212 is requested by the storage controller 1210 to allocate a new log block in which RPMB data is to be written since the current active log block does not exist when a write request for RPMB data occurs.

In operation S143, the block manager 1212 checks whether an RPMB free block exists in the free block pool or the free block list. If the RPMB data is accessed and updated frequently, there is a high possibility that RPMB free blocks exist in the free block pool. However, when the update of the RPMB data is sparse, the RPMB free block may not exist in the free block pool. If there is an RPMB free block in the free block pool ('Yes' direction), the procedure moves to operation S145. On the other hand, if the RPMB free block does not exist in the free block pool ('No' direction), the procedure moves to operation S147.

In operation S145, the block manager 1212 allocates the RPMB free block existing in the free block pool as the log block for writing write-requested RPMB data.

In operation S147, the block manager 1212 allocates the general free block as the log block for writing the write-requested RPMB data.

In the above disclosed embodiments, the function of giving priority to RPMB free blocks when the block manager 1212 allocates log blocks has been described. The number of RPMBs in the nonvolatile memory device 1200 may be limited by the above-described tracking function of the RPMB of the block manager 1212 and the function of allocating the RPMB free block as a log block with priority.

Figure 7:
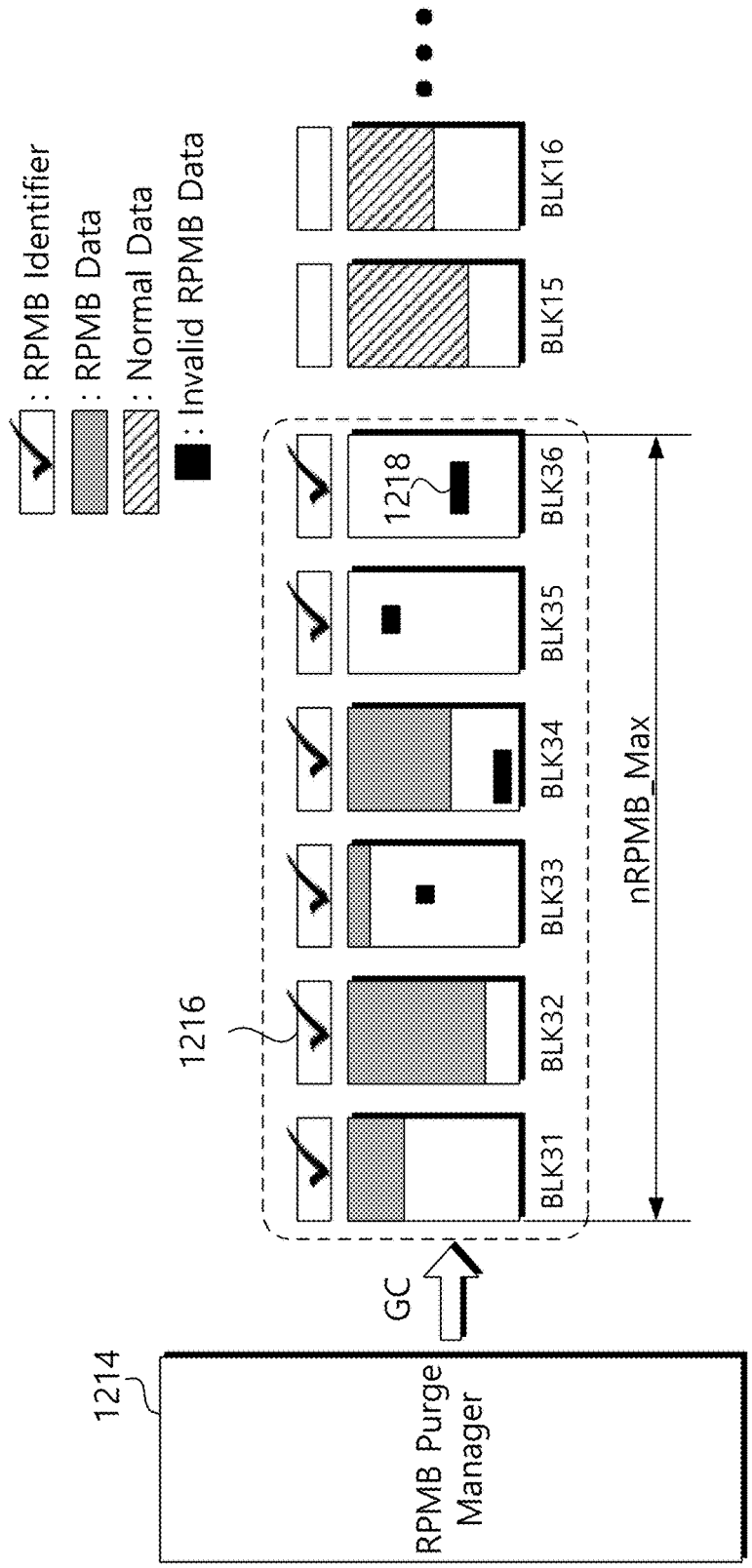
FIG. 7 is a diagram exemplarily showing the main functions of the RPMB purge manager of the present disclosure.

FIG. 7 is a diagram showing the main functions of the RPMB purge manager of the present disclosure. Referring to FIG. 7, the RPMB purge manager 1214 may manage the number of RPMBs (nRPMB) to be less than or equal to a predetermined maximum number of RPMBs (nRPMB_Max). For this, the RPMB purge manager 1214 may use garbage collection GC.

The RPMB purge manager 1214 may perform a block management operation for maintaining the number of RPMBs (e.g., nRPMB) to which the RPMB identifier 1216 is assigned below nRPMB_Max. For example, the value of nRPMB_Max may be 6. Subsequently, the RPMB to which the current RPMB identifier 1216 is assigned may correspond to six memory blocks BLK31 to BLK36. For example, four RPMBs (BLK31, BLK32, BLK33, BLK34) containing valid RPMB data and two RPMBs (BLK35, BLK36) containing invalid RPMB data are included in the RPMB.

At this time, the RPMB purge manager 1214 may recognize that the value of nRPMB has reached nRPMB_Max, and may trigger garbage collection for the RPMBs BLK31 to BLK36. Subsequently, valid RPMB data remaining in the four RPMBs BLK31, BLK32, BLK33, and BLK34 may be collected and written to the log block. Furthermore, the four RPMBs BLK31, BLK32, BLK33, and BLK34 may be converted into free block by garbage collection. The six RPMBs BLK31 to BLK36 may be reduced to one or two RPMB by garbage collection. Thereafter, when the RPMB purge command is provided, the RPMB purge manager 1214 may perform a purge operation only on the reduced RPMBs.

In the above disclosed embodiments, the function of limiting the value of nRPMB by the RPMB purge manager 1214 has been described. The total number of RPMBs (e.g., nRPMB) in the storage device 1200 may be managed to be less than or equal to the maximum number of RPMBs (e.g., nRPMB_Max) by garbage collection performed by the RPMB purge manager 1214. Through these features, the performance of the purge operation, based on the RPMB purge command, may be improved.

Figure 8:
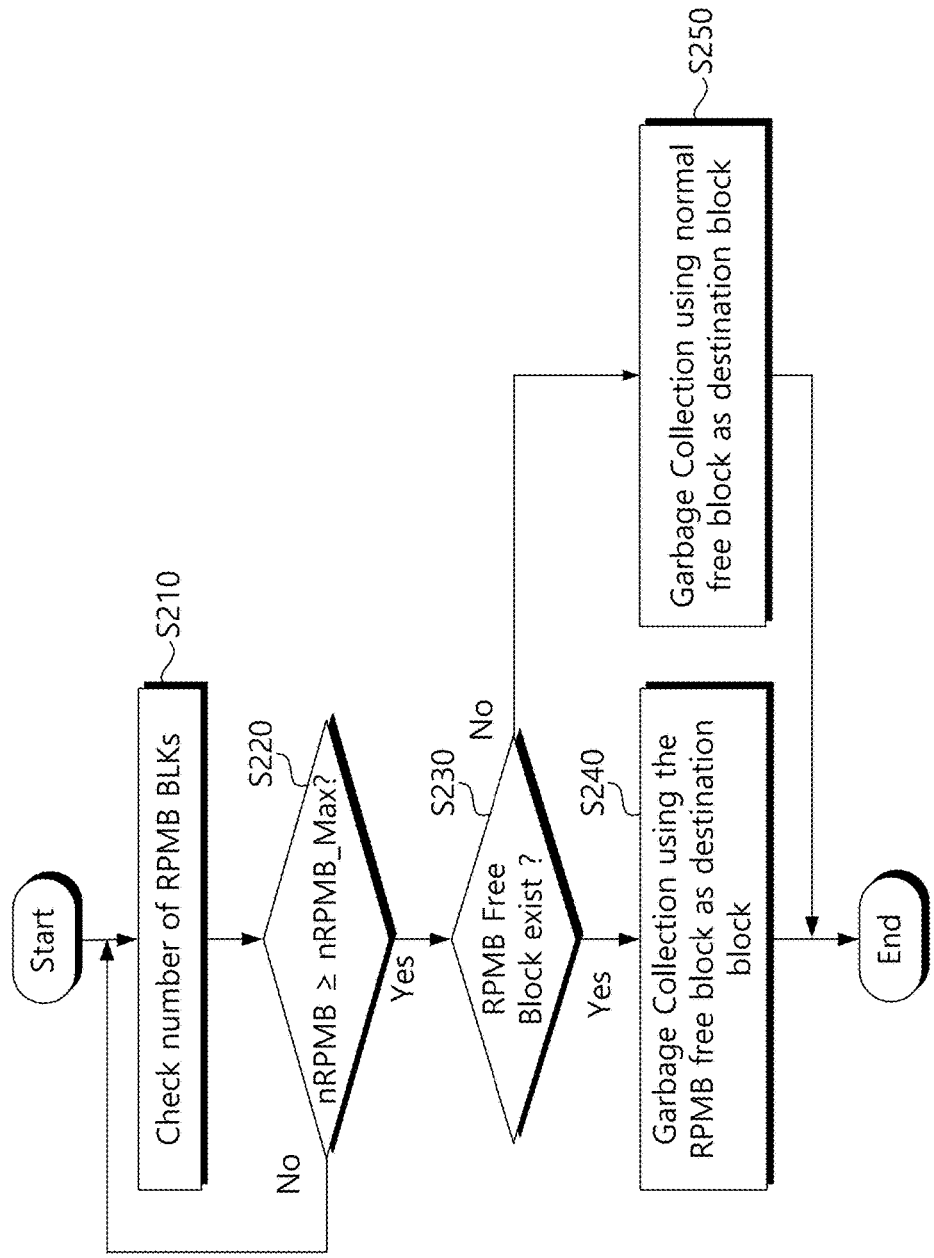
FIG. 8 is a flowchart schematically illustrating an operation of limiting the number of RPMBs (nRPMB) of the RPMB purge manager according to the present disclosure.

FIG. 8 is a flowchart schematically illustrating an operation of limiting the value of nRPMB of the RPMB purge manager according to the present disclosure. Referring to FIG. 8, the RPMB purge manager 1214 (see FIG. 7) monitors the value of nRPMB, and manages the value of nRPMB to be below the threshold nRPMB_Max.

In operation S210, the RPMB purge manager 1214 may check the value of nRPMB currently being tracked. The value of nRPMB may indicate the number of counts of all RPMB having RPMB data regardless of valid or invalid. In one or more examples, RPMB free blocks managed as logically un-mapped or mapped-out free blocks may also be counted in the value of nRPMB.

In operation S220, the RPMB purge manager 1214 determines whether the checked value of nRPMB has reached the threshold nRPMB_Max. If it is determined that the current value of nRPMB is equal to or greater than the threshold nRPMB_Max('Yes' direction), the procedure moves to operation S230. On the other hand, if it is determined that the current value of nRPMB is less than the threshold nRPMB_Max('No' direction), the procedure returns to operation S210.

In operation S230, the RPMB purge manager 1214 checks whether an RPMB free block exists in the free block pool. If it is checked that the RPMB free block exists in the free block pool ('Yes' direction), the procedure moves to operation S240. On the other hand, if it is checked that the RPMB free block does not exist in the free block pool ('No' direction), the procedure moves to operation S250.

In operation S240, the RPMB purge manager 1214 may perform garbage collection using the RPMB free block as a destination block for writing the collected valid RPMB data. When all valid RPMB data is moved to the destination block by garbage collection, the RPMB in which only invalid RPMB data remains is designated as the free block.

In operation S250, the RPMB purge manager 1214 allocates a normal free block as the destination block for garbage collection in a situation where the RPMB free block does not exist. When the collected valid RPMB data is written to the general free block, a new RPMB is generated. However, RPMBs in which only invalid RPMB data remains due to garbage collection are designated as free blocks, and is released from the RPMB after physical erasure. Accordingly, based on these operations the number of RPMBs does not substantially increase.

In the above disclosed embodiments, a procedure for managing the value of nRPMB to be less than or equal to the threshold nRPMB_Max using the garbage collection by the RPMB purge manager 1214 has been described. The value of nRPMB in the storage device 1200 is limited through mutual cooperation between the RPMB purge manager 1214 and the block manager 1212, which leads to the advantageous feature of improving the RPMB purge performance.

Figure 9A:
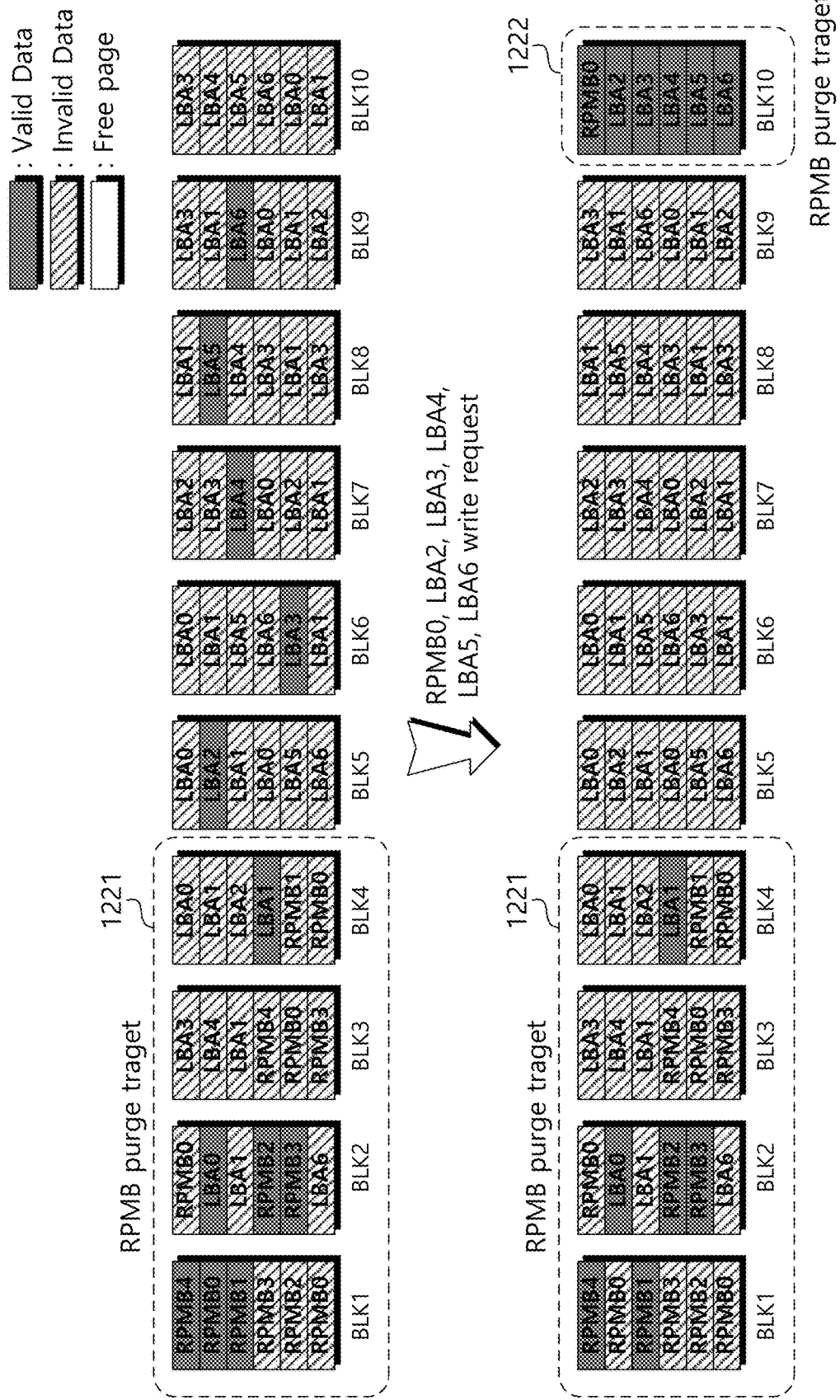

FIG. 9A and FIG. 9B illustrate examples in which the number of RPMBs (e.g., nRPMB) increases in a general case in which the number of RPMBs is not limited. Referring to FIG. 9A, when a general RPMB data write request occurs, the number of RPMBs increases.

Currently, there are four RPMBs BLK1, BLK2, BLK3, and BLK4. Among the four RPMBs, memory blocks BLK1, BLK2, BLK4 storing valid RPMB data and memory block BLK3 storing invalid RPMB data are included. Furthermore, valid data LBA2, LBA3, LBA4, LBA5, and LBA6 exists in each of the five memory blocks BLK5, BLK6, BLK7, BLK8, and BLK9. On the other hand, only invalid data is maintained in the memory block BLK10. As a result, when the RPMB purge command is received in this situation, the four RPMBs BLK1, BLK2, BLK3, and BLK4 become the RPMB purge target 1221.

In this situation, a write request for RPMB data RPMB0 and general data LBA2, LBA3, LBA4, LBA5, LBA6 may occur. Write operations on RPMB data RPMB0 and general data LBA2, LBA3, LBA4, LBA5, LBA6 may be performed without management of the RPMB. In this case, the memory block BLK10 is allocated as the log block, and write-requested data RPMB0, LBA2, LBA3, LBA4, LBA5, and LBA6 may be written into the memory block BLK10. Furthermore, since the updated RPMB data RPMB0 is written in the memory block BLK10, this block is designated as a new RPMB. Accordingly, when the RPMB purge command is provided, the RPMB purge targets 1221 and 1222 to which the RPMB purge is to be performed increases to 5 memory blocks.

Referring to FIG. 9B, there are currently four RPMBs BLK1, BLK2, BLK3, and BLK4. Among the four RPMBs, memory blocks BLK1, BLK2, BLK4 storing valid RPMB data and the memory block BLK3 storing invalid RPMB data are included. Furthermore, valid data LBA2, LBA3, LBA4, LBA5, and LBA6 exist in each of the five memory blocks BLK5, BLK6, BLK7, BLK8, and BLK9. In addition, only invalid data is maintained in the memory block BLK10. As a result, when the RPMB purge command is received in this situation, the four RPMBs BLK1, BLK2, BLK3, and BLK4 become the RPMB purge target 1221.

In this situation, a write request for RPMB data RPMB0 and normal data LBA2, LBA3, LBA4, LBA5, and LBA6 may occur. In this case, the memory block BLK3, which is the RPMB, is designated as the log block, and the write-requested data RPMB0, LBA2, LBA3, LBA4, LBA5, and LBA6 may be written to the erased memory block BLK3. Subsequently, the RPMB purge target 1221 substantially maintains four blocks.

In one or more examples, a write request of the RPMB data RPMB1 is additionally generated. Subsequently, in order to write the RPMB data RPMB1, the memory block BLK5 may be designated as the free block, and may be provided as a log block after being erased. After block BLK5 is erased, the RPMB data RPMB1 is written to the memory block BLK5. At this time, when the RPMB purge command is provided, the RPMB purge target 1223 for which the RPMB purge is to be performed increases to five memory blocks (e.g., BLK1, BLK2, BLK3, BLK4, and BLK5).

As demonstrated in the examples of FIG. 9A and FIG. 9B, the value of nRPMB continuously increases without a configuration or function for limiting the value for nRPMB, which results in significantly degrading the performance of the RPMB purge operation.

Figure 10:
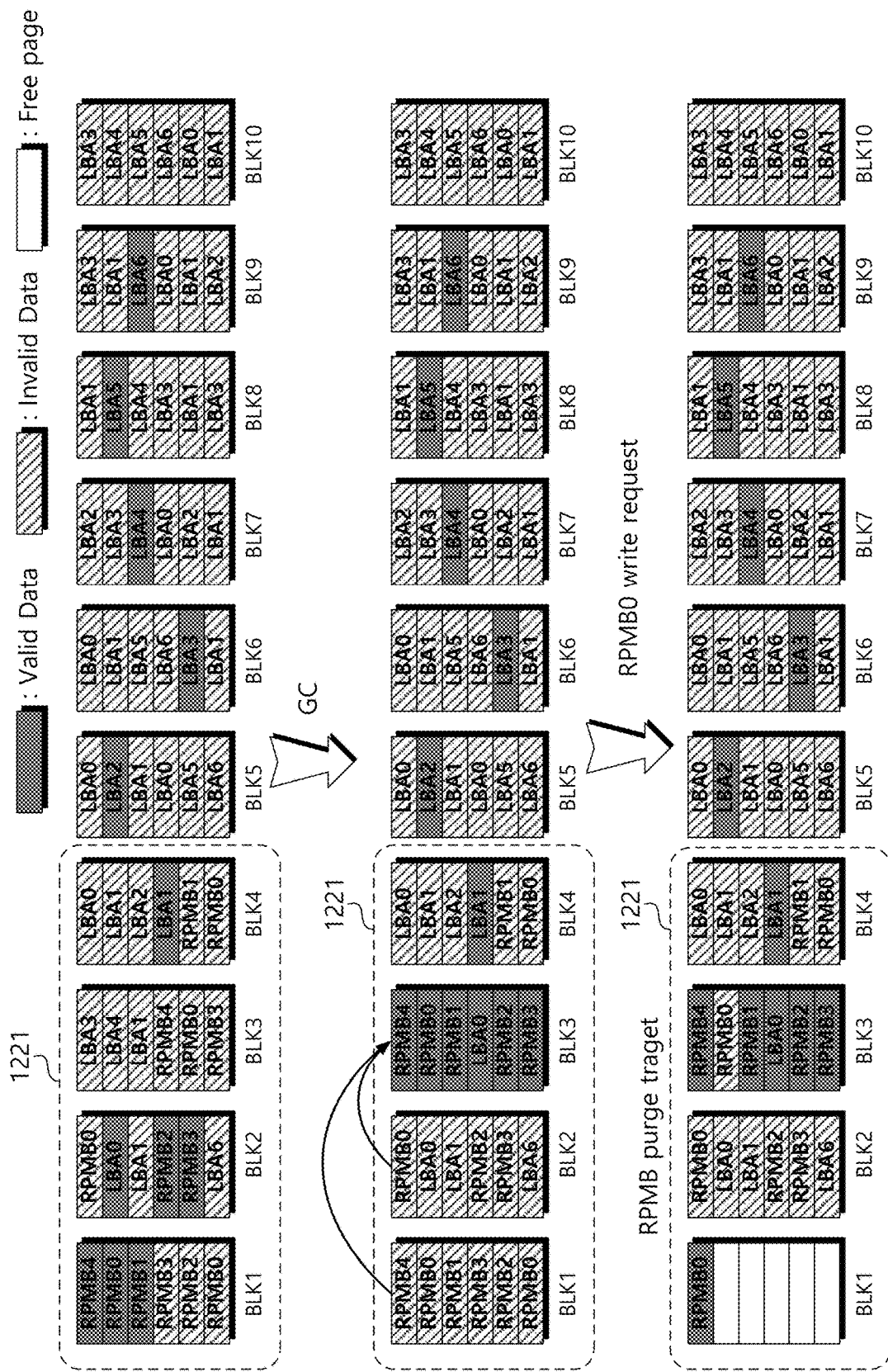
FIG. 10 is a diagram showing that the number of RPMB purge targets can be controlled by limiting the nRPMB according to one or more embodiments of the present disclosure.

FIG. 10 is a diagram showing that the number of RPMB purge targets may be controlled by limiting the value of nRPMB according to one or more embodiments of the present disclosure. Referring to FIG. 10, an increase in the value of nRPMB may be suppressed by garbage collection controlled by the RPMB purge manager 1214. For example, the maximum number of RPMBs may be controlled by the variable nRPMB_Max, which may be 4. In addition, it is assumed that the initial condition is the same as that of FIG. 9A or FIG. 9B.

Currently, there are four RPMBs BLK1, BLK2, BLK3, and BLK4. The four RPMBs include the three memory blocks BLK1, BLK2, BLK4 storing valid RPMB data and one memory block BLK3 storing invalid RPMB data. In addition, valid data LBA2, LBA3, LBA4, LBA5, and LBA6 exists in each of the five memory blocks BLK5, BLK6, BLK7, BLK8, and BLK9. Furthermore, only invalid data is maintained in the memory block BLK10. As a result, when the RPMB purge command is received in this situation, the four RPMBs BLK1, BLK2, BLK3, and BLK4 become the RPMB purge target 1221. The current value for nRPMB is monitored as 4 corresponding to the threshold nRPMB_Max. Accordingly, the garbage collection GC of the present disclosure by the RPMB purge manager 1214 may be triggered.

Garbage collection GC may occur within the RPMB purge target 1221. For example, the memory block BLK3 may be designated as the free block and may be allocated as a log block after being erased. The valid data LBA0, RPMB0, RPMB1, RPMB2, RPMB3, and RPMB4 stored in the RPMBs BLK1 and BLK2 are collected and written to the memory block BLK3 allocated as the log block. Even after garbage collection GC, the value of nRPMB is still maintained at four. That is, substantially four RPMB purge targets 1221 are maintained.

In this situation, it is assumed that a write request of the RPMB data RPMB0 is additionally generated. Subsequently, in order to write the RPMB data RPMB0, the memory block BLK1 may be designated as a free block, and may be provided as a log block after being erased. Furthermore, the RPMB data RPMB0 may be written to the memory block BLK1. At this time, if the RPMB purge command is provided, the value of nRPMB corresponding to the RPMB purge target 1221 to be performed the RPMB purge still does not exceed four. This operation ensures improved RPMB purge performance compared to the example of FIG. 9B in which the number of RPMB purge targets is increased to five (e.g., the value of nRPMB exceeds nRPMB_max).

The functions of tracking the RPMB and limiting the value of nRPMB by the storage controller 1210 of the present disclosure have been described. However, these functions are merely exemplary, and may be modified as necessary as understood by one of ordinary skill in the art. Based on these functions, the number of RPMBs may be advantageously maintained below the predetermined threshold nRPMB_Max.

Figure 11:
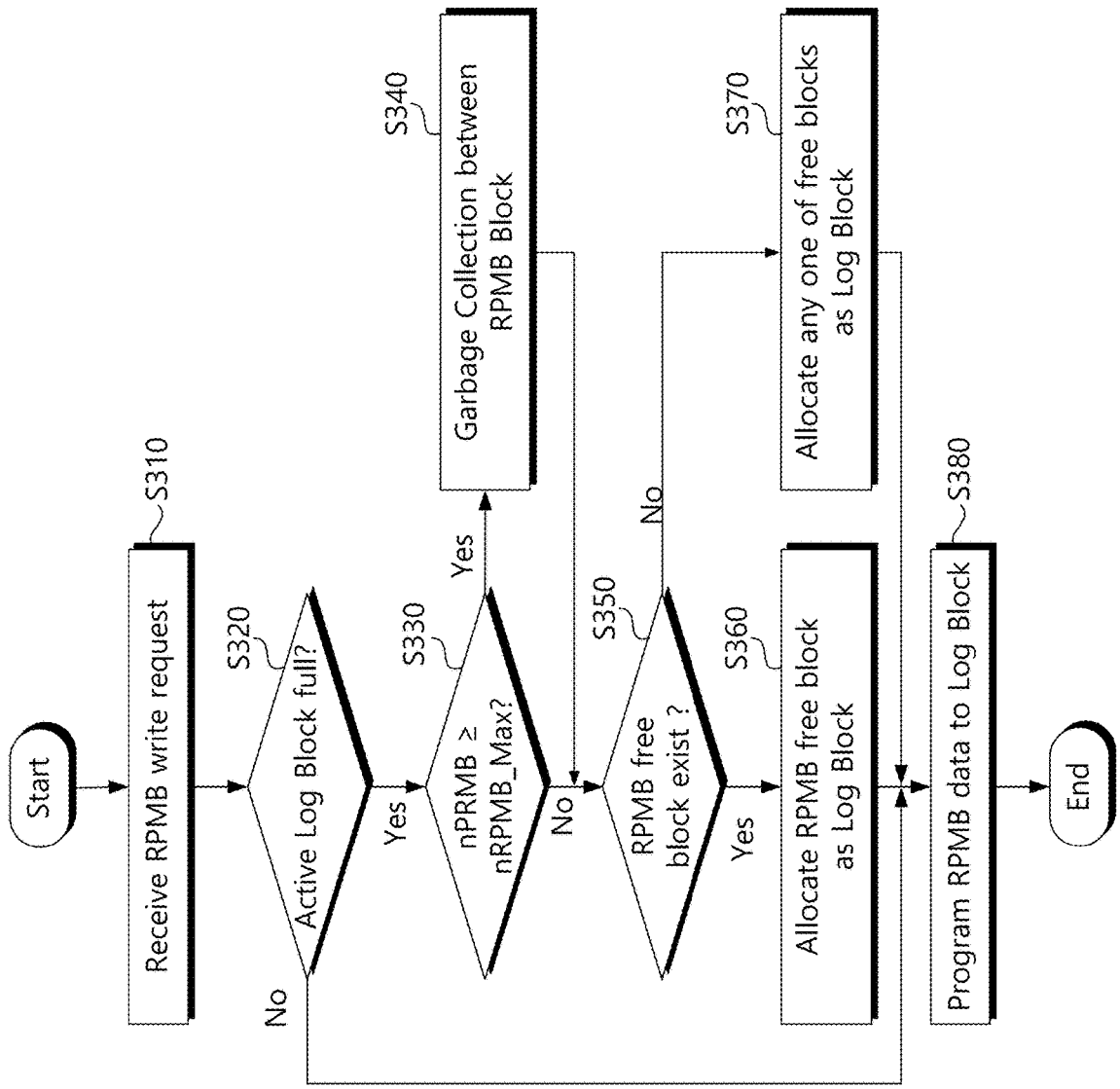
FIG. 11 is a flowchart schematically illustrating a write operation of RPMB data of a storage controller according to one or more embodiments of the present disclosure.

FIG. 11 is a flowchart schematically illustrating a write operation of RPMB data of a storage controller according to one or more embodiments of the present disclosure. Referring to FIG. 11, the storage controller 1210 (refer to FIG. 2) may track the RPMB and limit the value of nRPMB.

In operation S310, an RPMB write request from the host 1100 (FIG. 1) to the storage device 1200 (FIG. 1) is transmitted. The storage controller 1210 receives the RPMB write request.

In operation S320, the storage controller 1210 determines whether there is enough space in the active log block to which the write-requested RPMB data is to be written. If there is enough space to write the requested RPMB data to the current active log block ('No' direction), the procedure moves to operation S380. However, if there is not enough space to write the requested RPMB data to the current active log block ('Yes' direction), the procedure moves to operation S330.

In operation S330, the storage controller 1210 determines whether the current value of nRPMB has reached the value set for nRPMB_Max. If it is determined that the current value of nRPMB is equal to or greater than the threshold nRPMB_Max ('Yes' direction), the procedure moves to operation S340. On the other hand, if it is determined that the current value of nRPMB is less than the threshold nRPMB_Max ('No' direction), the procedure moves to operation S350.

In operation S340, the storage controller 1210 may perform garbage collection in the currently tracked and identified RPMBs. For example, the storage controller 1210 may select a log block for copying valid RPMB pages of the RPMBs from among the RPMB free blocks. The storage controller 1210 may physically erase the selected RPMB free block. In addition, the storage controller 1210 may collect and copy valid RPMB pages using the erased RPMB free block as a log block. Due to garbage collection, a plurality of memory blocks in which only invalid RPMB data remains among the RPMBs are generated. A memory block with only these invalid pages remaining may be designated as the RPMB free block.

In operation S350, the storage controller 1210 checks whether an RPMB free block exists in the free block pool. If there is an RPMB free block in the free block pool ('Yes' direction), the procedure moves to operation S360. On the other hand, if the RPMB free block does not exist in the free block pool ('No' direction), the procedure moves to operation S370.

In operation S360, the storage controller 1210 allocates an RPMB free block existing in the free block pool as a log block. After the RPMB free block allocated as the log block is physically erased, the RPMB free block is provided as a log block for the RPMB data requested to be written in operation S310.

In operation S370, the storage controller 1210 allocates a general free block existing in the free block pool as a log block. A normal free block allocated as the log block is provided as the log block for RPMB data requested to be written in operation S310 via a physical erase procedure.

In operation S380, the storage controller 1210 programs the RPMB data requested to be written in operation S310 in the allocated log block.

The garbage collection or log block selection procedure for the write operation of the RPMB data of the storage controller 1210 has been described above. The storage controller 1210 may limit the value of nRPMB through garbage collection GC among the RPMBs when the write request for RPMB data is requested.

Figure 12:
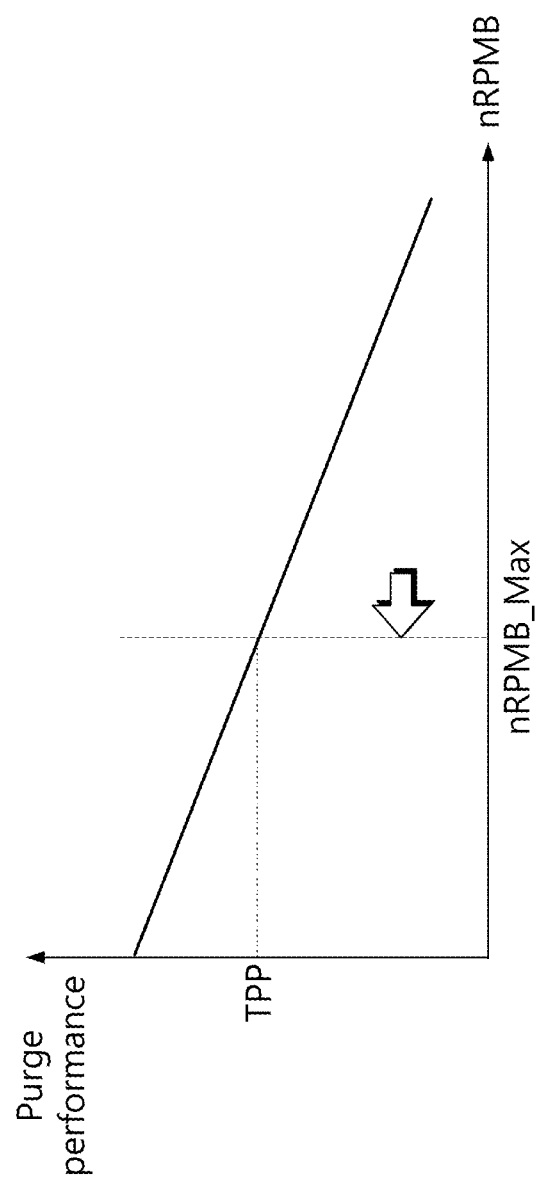
FIG. 12 is a graph exemplarily showing the effect of one or more embodiments of the present disclosure.

FIG. 12 is an exemplary graph showing the effect of the present disclosure. Referring to FIG. 12, the number of RPMBs of the storage device 1200 and the purge performance according to the RPMB purge command may be represented inversely proportional relationship. In this regard, as the value of nRPMB increases, the purge performance decreases.

The horizontal axis of the graph represents the value of nRPMB, and the vertical axis of the graph represents purge performance or purge speed. If the value of nRPMB is limited to nRPMB_Max, as disclosed in the above described embodiments, the purge performance is able to advantageously maintain more than the target purge performance TPP.

Figure 13:
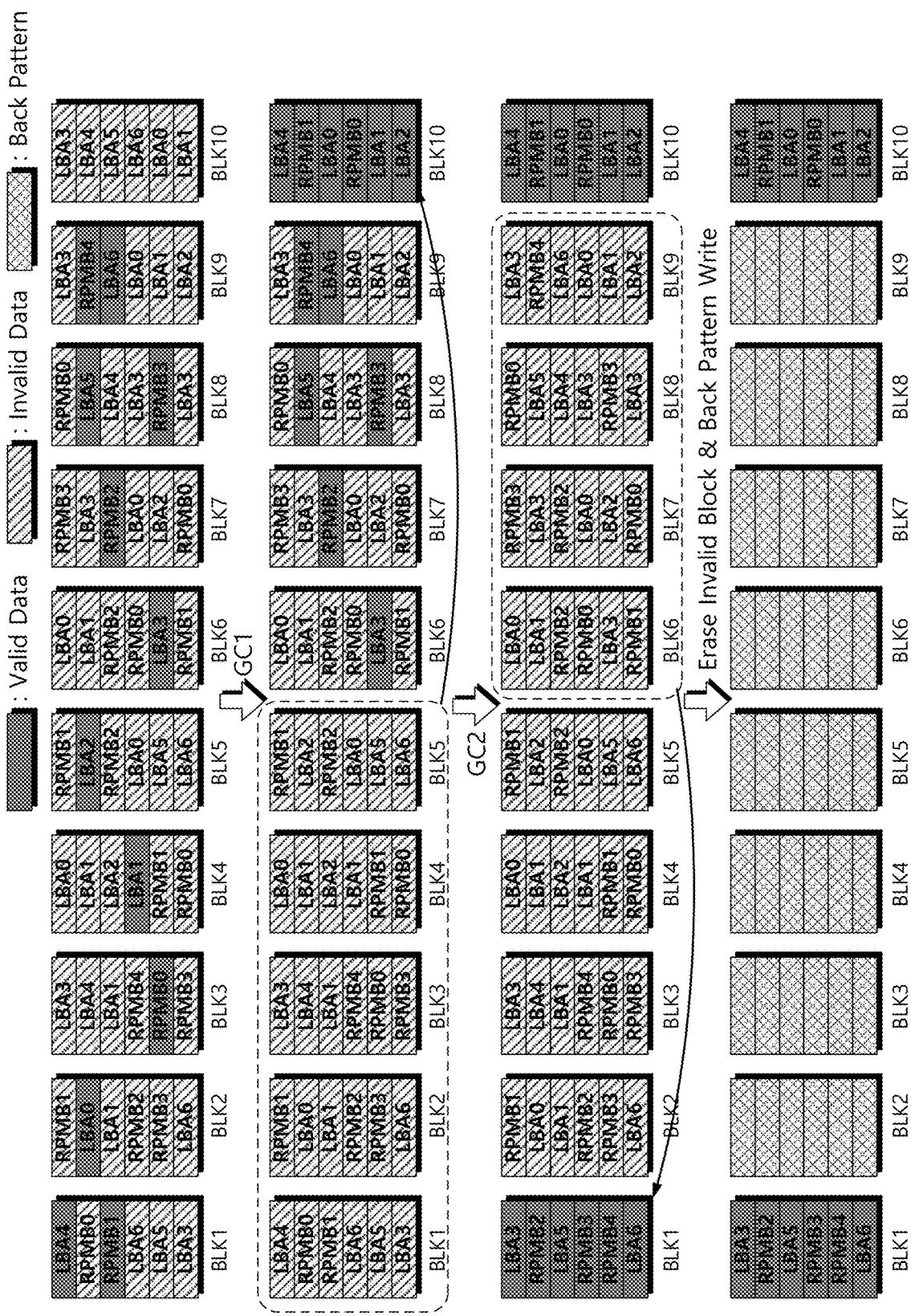
FIG. 13 and FIG. 14 are diagrams respectively showing a general purge operation in the case of including a back pattern program procedure and a purge operation of one or more embodiments of the present disclosure.
Figure 14:
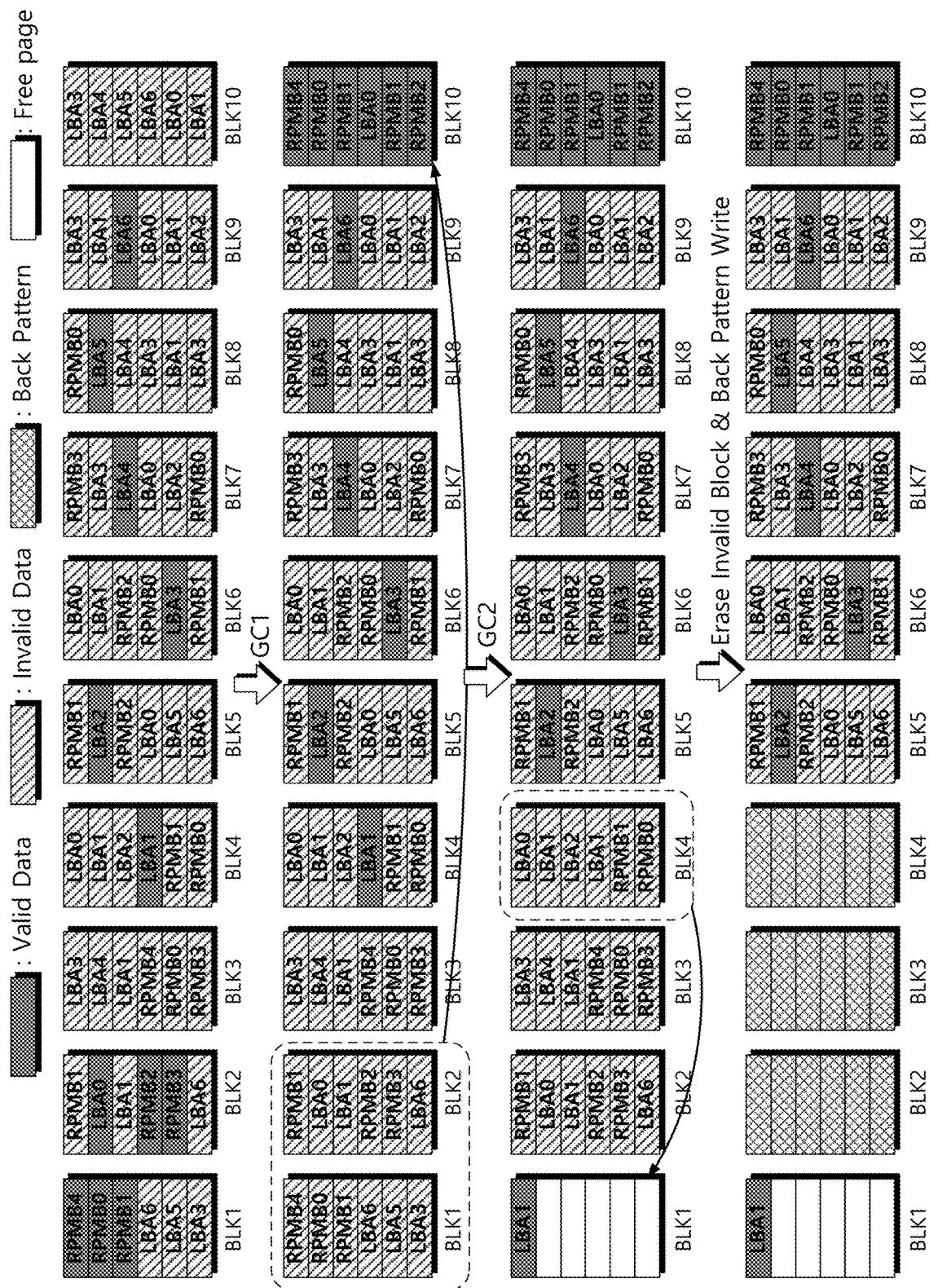

FIG. 13 and FIG. 14 are diagrams respectively showing a general purge operation in the case of including a back pattern program procedure and a purge operation of the present disclosure. FIG. 13 shows a purge operation when the value of nRPMB is not limited. FIG. 14 shows a purge operation when the value of nRPMB is limited.

Referring to FIG. 13, when the RPMB purge command is provided, in a general case where the value of nRPMB is not limited, a relatively decrease in purge performance occurs. First, in the initial condition, nine RPMBs BLK1 to BLK9 having valid or invalid RPMB data and one normal block BLK10 having only invalid data may current exist in the storage device. By the performing garbage collection GC1 performed in this state, the memory block BLK10 in which valid data does not exist is erased and provided as a log block. Furthermore, valid RPMB data of the five RPMBs BLK1, BLK2, BLK3, BLK4, and BLK5 is collected and programmed in the memory block BLK10 provided as the log block. Subsequently, the memory block BLK10 may be managed as the RPMB, and the total number of RPMBs increases to 10.

By performing subsequent garbage collection GC2, valid RPMB data of the remaining four RPMBs BLK6, BLK7, BLK8, BLK9 is collected and programmed into the memory block BLK1 provided as the log block after erasure. However, the value of nRPMB is still maintained at 10.

Subsequently, erase and back pattern write operations are performed on the invalid RPMBs BLK2 to BLK9 generated through garbage collections GC1 and GC2. As a result, eight invalid RPMBs BLK2 to BLK9 are erased, and thereafter, a back pattern is programmed in each of the memory blocks. In addition, the eight invalid RPMBs BLK2 to BLK9 in which the back pattern is programmed may be managed as free blocks. As an example, a back pattern write operation writes back pattern data (e.g., valid data erased during an erasure operation or valid data collected during garbage collection) to a memory block.

In the above example, the RPMB purge operation in the case where the value of nRPMB is not limited and the RPMB free block in an invalid state is not preferentially used as a log block in the garbage collection GC operation has been described. In this case, the number of RPMBs disadvantageously increases even when garbage collection is performed in response to the RPMB purge command. When erasing and writing back patterns for the increased RPMBs is performed, as understood by one of ordinary skill in the art, the overall purge performance decreases.

Referring to FIG. 14, the value of nRPMB is limited, and in the case of the storage device 1200 of the present disclosure that preferentially provides RPMB free blocks over non-RPMB free blocks as log blocks, purge performance is improved compared to the example of FIG. 13.

First, in the initial condition, eight RPMBs BLK1 to BLK8 having valid or invalid RPMB data, a memory block BLK9 having valid data LBA6, and one normal memory block BLK10 having only invalid data may exist in the storage device. At this time, by the garbage collection GC1 triggered by the block management operation of the present disclosure, the memory block BLK10 in which valid data does not exist is erased and provided as a log block. Subsequently, valid RPMB data of the two RPMBs BLK1 and BLK2 is collected and programmed into the memory block BLK10 provided as the log block. After the collection, the memory block BLK10 is designated and managed as the RPMB, and the total value of nRPMB increases to nine.

However, the valid data LBA1 of the RPMB BLK4 is collected and then programmed into the memory block BLK1 provided as the log block after being erased by the garbage collection GC2. After garbage collection GC2, the memory block BLK1 is released from the RPMB. Accordingly, the value of nRPMB is reduced to eight.

Subsequently, erase and back pattern write operations are performed on the three invalid RPMBs BLK2, BLK3, and BLK4 generated through the of garbage collections GC1 and GC2. The three invalid RPMBs BLK2, BLK3, and BLK4 are erased, and thereafter, the back pattern is programmed in each of the memory blocks. Furthermore, the three invalid RPMBs BLK2, BLK3, and BLK4 in which the back pattern is programmed may be released from the RPMB and managed as the free block. As a result, the value of nRPMB is reduced to five.

In the above described embodiments, the RPMB purge operation of the present disclosure in which an invalid RPMB free block is preferentially allocated during garbage collection GC for limiting the value of nRPMB and log block allocation, has been described. In this case, the number of RPMBs may be limited to a specific number or less. Accordingly, when erasing and writing the back pattern of the RPMBs are performed when the RPMB purge command is provided, overall purge performance is advantageously improved.

Figure 15:
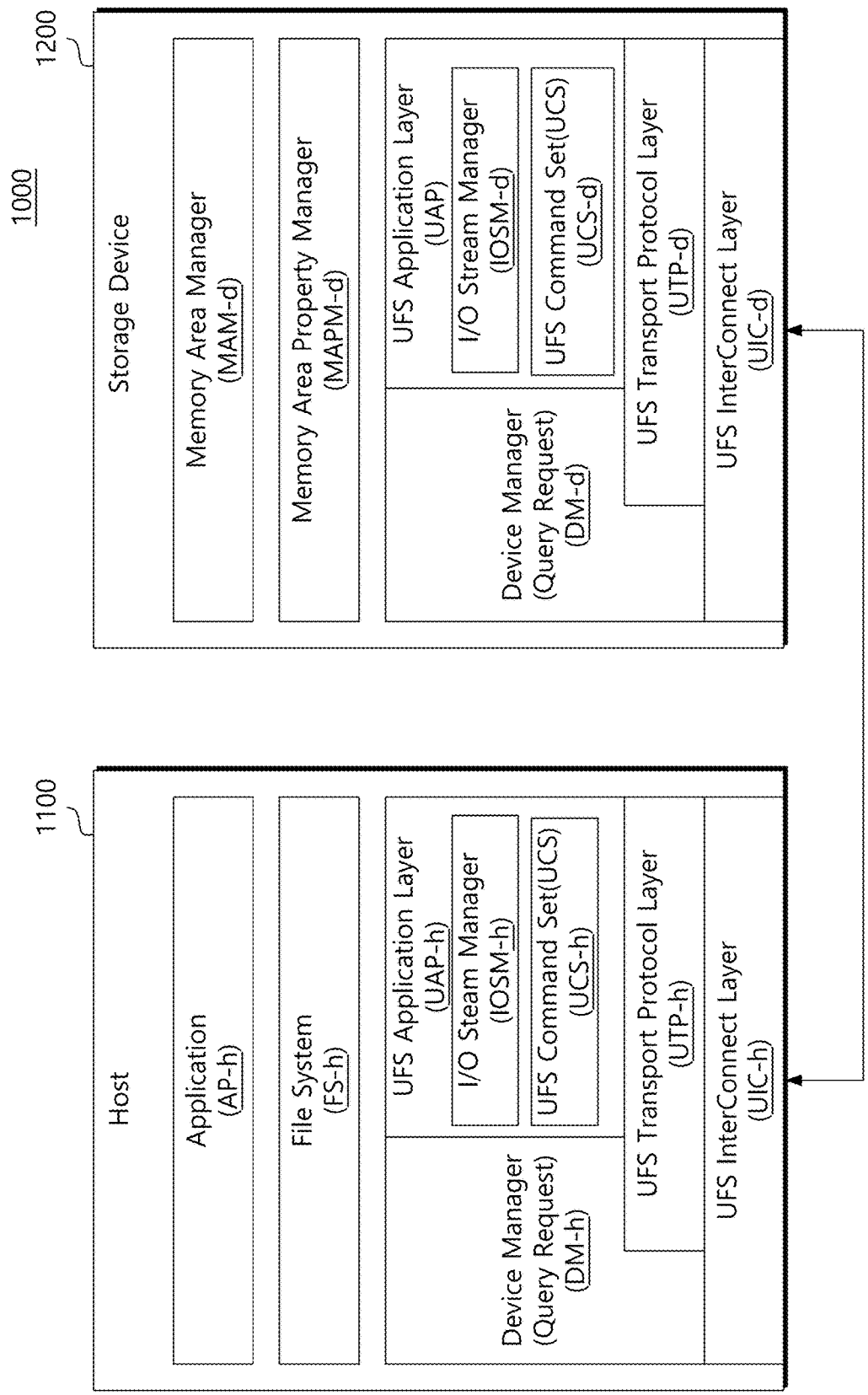
FIG. 15 is a diagram exemplarily showing a hierarchical structure of the system of FIG. 1, according to one or more embodiments of the present disclosure.

FIG. 15 is a diagram showing a hierarchical structure of the system of FIG. 1, according to one or more embodiments. Referring to FIG. 15, a system 1000 may include a host 1100 and a storage device 1200. Host 1100 may include application (AP-h), file system (FS-h), device manager (DM-h), UFS application layer (UAP-h), UFS transport protocol layer (UTP-h), and UFS interconnect It may include a layer (UIC-h).

The application AP-h may include various application programs and processes running in the host 1100. The file system FS-h may be configured to organize and manage various data generated by the application AP-h.

The UFS application layer (UAP-h) may be configured to support various commands between the host 1100 and the storage device 1200. For example, the UFS application layer (UAP-h) may include an input/output manager (IOM-h) and a UFS command set (USC-h). The input/output stream manager (IOM-h) may be configured to manage requests from applications (AP-h) or file systems (FS-h).

In one or more embodiments, the input/output stream manager (IOM-h) may be configured to classify a characteristic value of input/output from an application (AP-h) or a file system (FS-h). The input/output stream manager (IOM-h) may manage requests from the application (AP-h) or the file system (FS-h) according to priority. In one or more examples, the input/output stream manager (IOM-h) may be configured to support various functions according to the request from the application (AP-h) or the file system (FS-h).

The UFS command set USC-h may support various command sets supported between the host 1100 and the storage device 1200. In one or more embodiments, the UFS command set USC-h may include a UFS native command set and a UFS SCSI command set. The UFS command set USC-h may configure commands to be transmitted to the storage device 1200 according to a request from the application AP-h or the file system FS-h. The UFS application layer (UAP-h) may further include a task manager that processes commands for command queue control.

The device manager DM-h may manage device level operations and device level configurations. In one or more embodiments, the device manager DM-h may manage a query request for setting or checking various information of the storage device 1200.

A UFS Transport Protocol layer (UTP-h; UFS Transport Protocol) may provide services for a higher layer. The UFS transport protocol layer (UTP-h) may generate a command or information provided from the UFS application layer (UAP-h) or a query request provided from the device manager (DM-h) in the form of a UPIU (UFS Protocol Information Unit) packet. In an exemplary embodiment, the UFS transport protocol layer (UTP-h) and the device manager (DM-h) may communicate with each other through a UDM-Service Access Point (UDM-SAP). The UFS transport protocol layer (UTP-h) and the UFS application layer (UAP-h) may communicate with each other via UTP_CMD_ SAP or UTP_TM_SAP.

The UFS interconnect layer (UIC-h) may manage the connection with the storage device 1200. In one or more embodiments, the UFS interconnect layer (UIC-h) may include hardware components such as MIPI Unipro and MIPI M-PHY physically connected to the UFS interconnect layer (UIC-d) of the storage device 1200. In one or more embodiments, the UFS interconnect layer (UIC-h) and the UFS transport protocol layer (UTP-h) may communicate via UIC-SAP. The UFS interconnect layer (UIC-h) and the device manager (DM-h) may communicate through UIO-SAP.

The storage device 1200 may include a memory area manager (MAM-d), a memory area property manager (MAPM-d), a device manager (DM-d), a UFS application layer (UAP-d), and a UFS transport protocol layer (UTP-d), and a UFS interconnect layer (UIC-d). In one or more embodiments, the configuration of the UFS application layer (UAP-d), the UFS transport protocol layer (UTP-d), and the UFS interconnect layer (UIC-d) may be similar to the configurations of UFS application layer (UAP-h) of the host 1100, UFS transport protocol layer (UTP-h), and UFS interconnect layer (UIC-h), respectively.

The memory area property manager MAPM-d of the storage device 1200 may designate and manage an area in which write data received from the host 1100 is to be stored. For example, as described above, write data received from the host 1100, according to an explicit request of the host 1100 or an internal policy, is a fixed turbo write buffer (TWB-p), a non-fixed turbo write buffer (TWB-np), and the user storage (UST) may be written to the space of at least one. The memory area property manager MAPM-d may select a space to store write data received from the host 1100 based on the various methods described above, and store the write data in the selected space.

The hierarchical structure and function of each of the host 1100 and the storage device 1200 described above are exemplary and the scope of the present disclosure is not limited thereto.

The above are specific embodiments for carrying out the present disclosure. In addition to the above-described embodiments, the present disclosure may include simple design changes or easily changeable embodiments. In addition, the present disclosure will include techniques that can be easily modified and implemented using the embodiments. Therefore, the scope of the present disclosure should not be limited to the above-described embodiments, and should be defined by the claims and equivalents of the claims of the present disclosure as well as the claims to be described later.

What is claimed is:

1. A storage device performing a purge operation in response to a replay protected memory block (RPMB) purge command, the storage device comprising:
   at least one nonvolatile memory device; and
   a storage controller configured to control data input and data output of the at least one nonvolatile memory device, track at least one RPMB of the at least one nonvolatile memory device in which RPMB data is stored, and trigger a garbage collection based on a number of RPMBs reaching a threshold,
   wherein the storage controller is further configured to prioritize allocation of a log block to which write data is to be programmed to a first memory block, among free blocks, that is an RPMB over a second memory block, among the free blocks, that is a non-RPMB, and
   wherein the storage controller is configured to, during execution of the garbage collection, (i) collect valid RPMB data in each RPMB, (ii) write the collected valid RPMB data to the log block, and (iii) convert each RPMB having the valid RPMB data to a free block such that the number of RPMBs is reduced, and
   wherein during execution of the garbage collection, each RPMB having only invalid RPMB data is not converted to the free block.

2. The storage device of claim 1, wherein each RPMB having the valid RPMB data comprises a memory block in which the valid RPMB data invalidated by an update is stored.

3. The storage device of claim 1, wherein each RPMB having the valid RPMB data comprises a memory block that stores logically erased RPMB data in which the memory block is designated as a free block before being physically erased.

4. The storage device of claim 1, wherein the storage controller is further configured to stop tracking after each RPMB having the valid RPMB data is physically erased.

5. The storage device of claim 1, wherein the write data corresponds to the RPMB data.

6. The storage device of claim 1, wherein the storage controller comprises:
   a block manager configured to assign an RPMB identifier to each RPMB having valid RPMB data or invalid RPMB data, the RPMB identifier being in a form of at least one of a tag, a list, and a table.

7. The storage device of claim 6, wherein the RPMB purge manager is further configured to select a free block having invalid RPMB data as a destination block to which the collected valid RPMB data is programmed in response to performance of the garbage collection.

8. The storage device of claim 6, wherein the garbage collection comprises programming back pattern data in a free block in which valid data does not exist.

9. The storage device of claim 1, wherein the purge operation, in response to the RPMB purge command, is performed on the reduced number of RPMBs.

10. A storage device comprising:
    a nonvolatile memory device; and
    a storage controller configured to perform garbage collection based on a number of replay protected memory blocks (RPMBs) in which RPMB data is stored among memory blocks of the nonvolatile memory device reaching a threshold value,
    wherein the storage controller is configured to, during execution of the garbage collection, (i) collect valid RPMB data in each RPMB, (ii) write the collected valid RPMB data to a log block, and (iii) convert each RPMB having the valid RPMB data to a free block such that the number of RPMBs is reduced, and
    wherein during execution of the garbage collection, each RPMB having only invalid RPMB data is not converted to the free block.

11. The storage device of claim 10, wherein the number of RPMBs in which RPMB data is stored comprises a free block having only invalid RPMB data.

12. The storage device of claim 11, wherein the storage controller is further configured to assign an RPMB identifier to a memory block in which the RPMB data is stored, and manage the memory block as the RPMB until a physical erasure occurs.

13. The storage device of claim 12, wherein the storage controller is further configured to, based on a write request being performed, preferentially allocates a memory block having the RPMB identifier over a non-RPMB from among free blocks as a log block of write-requested data.

14. The storage device of claim 12, wherein the storage controller is further configured to allocate the free block having the RPMB identifier as a destination block to which valid data collected from RPMBs is copied when the garbage collection is performed.

15. A method for managing a memory block of a storage device that performs a purge operation in response to a replay protected memory block (RPMB) purge command, the method comprising:
    determining whether a number of RPMBs in which RPMB data is stored reaches a threshold value;
    selecting, from a plurality of free blocks, one of the plurality of free blocks including invalid RPMB data in response to a determination the number of RPMBs reaches the threshold value;
    copying valid data collected from a RPMB from the number of RPMBs to the selected one of the plurality of free blocks; and
    converting each RPMB having valid RPMB data to a free block such that the number of RPMBs is reduced, wherein each RPMB having only invalid RPMB data is not converted to the free block.

16. The method of claim 15, further comprising:
receiving a write request to the storage device; and
based on the write request, allocating another one of the plurality of free blocks including invalid RPMB data as a log block for writing write-requested data.

17. The method of claim 16, wherein the write-requested data comprises RPMB data.

18. The method of claim 15, further comprising:
assigning an RPMB identifier to the RPMB from the number of RPMBs,
wherein the RPMB identifier is managed by at least one of a tag, a list, and a table.

19. The method of claim 18, wherein the RPMB identifier is released after the RPMB from the number of RPMBs is physically erased.

20. The method of claim 15, further comprising:
erasing at least one RPMB having only invalid RPMB data from the number of RPMBs; and
programing, after the erasing, back pattern data to the at least one RPMB having only invalid RPMB data.

* * * * *